(12) United States Patent
Kitamura et al.

(10) Patent No.: US 10,407,187 B2
(45) Date of Patent: Sep. 10, 2019

(54) DEVICE FOR CONTROLLING ATTITUDE OF SPACECRAFT AND METHOD FOR CALCULATING CMG GIMBAL ANGLE

(71) Applicant: MITSUBISHI ELECTRIC CORPORATION, Chiyoda-ku (JP)

(72) Inventors: Kenji Kitamura, Chiyoda-ku (JP); Katsuhiko Yamada, Chiyoda-ku (JP); Takeya Shima, Chiyoda-ku (JP)

(73) Assignee: MITSUBISHI ELECTRIC CORPORATION, Chiyoda-ku (JP)

( * ) Notice: Subject to any disclaimer, the term of this patent is extended or adjusted under 35 U.S.C. 154(b) by 0 days.

(21) Appl. No.: 15/735,653

(22) PCT Filed: Jun. 17, 2016

(86) PCT No.: PCT/JP2016/068096
§ 371 (c)(1),
(2) Date: Dec. 12, 2017

(87) PCT Pub. No.: WO2016/208504
PCT Pub. Date: Dec. 29, 2016

(65) Prior Publication Data
US 2019/0061978 A1    Feb. 28, 2019

(30) Foreign Application Priority Data

Jun. 22, 2015   (JP) ................. 2015-124561

(51) Int. Cl.
*B64G 1/28* (2006.01)
*G01C 19/02* (2006.01)
(Continued)

(52) U.S. Cl.
CPC ............. *B64G 1/286* (2013.01); *B64G 1/244* (2019.05); *B64G 1/28* (2013.01); *B64G 1/288* (2013.01);
(Continued)

(58) Field of Classification Search
CPC .......... B64G 1/286; B64G 1/288; B64G 1/28; G01C 19/02; G05D 1/08
(Continued)

(56) References Cited

U.S. PATENT DOCUMENTS 5,692,707 A * 12/1997 Smay ................. B64G 1/24
244/165
6,681,649 B2 * 1/2004 Hyde .................. B64G 1/286
244/165
(Continued)

FOREIGN PATENT DOCUMENTS

JP    2004-535324 A    11/2004
JP    2006-240375 A     9/2006
(Continued)

OTHER PUBLICATIONS

International Search Report dated Jul. 26, 2016 in PCT/JP2016/068096, filed on Jun. 17, 2016.

*Primary Examiner* — Tan Q Nguyen
(74) *Attorney, Agent, or Firm* — Oblon, McClelland, Maier & Neustadt, L.L.P.

(57) ABSTRACT

When the number of CMGs is represented by n (n is an integer of 4 or more), (n−3) gimbal angles out of n gimbal angles corresponding to the n CMGs are set as free parameters, and an algebraic equation representing a relationship among three gimbal angles out of the n gimbal angles, the free parameters, and an angular momentum of all the CMGs is used to solve the algebraic equation while changing the free parameters within set ranges, to thereby obtain solutions of the gimbal angles of the plurality of CMGs required for achieving a given angular momentum.

10 Claims, 12 Drawing Sheets

(51) Int. Cl.
    *G05D 1/08*     (2006.01)
    *B64G 1/24*     (2006.01)

(52) U.S. Cl.
    CPC .............. *G01C 19/02* (2013.01); *G05D 1/08* (2013.01); *B64G 2001/245* (2013.01)

(58) Field of Classification Search
    USPC .......................................................... 701/13
    See application file for complete search history.

(56) References Cited

U.S. PATENT DOCUMENTS

| | | | |
|---|---|---|---|
| 7,654,490 B2* | 2/2010 | Patel | B64G 1/26 244/165 |
| 9,963,248 B2* | 5/2018 | Wang | B64G 1/24 |
| 2003/0188592 A1* | 10/2003 | Hyde | B64G 1/286 74/5.45 |
| 2004/0167683 A1 | 8/2004 | Lagadec et al. | |
| 2011/0309191 A1* | 12/2011 | McClure | B64C 17/06 244/79 |

FOREIGN PATENT DOCUMENTS

| | | | |
|---|---|---|---|
| JP | 2008-189235 A | 8/2008 | |
| JP | 2012-051387 A | 3/2012 | |

\* cited by examiner

SPIN AXIS

GIMBAL AXIS

DEVICE FOR CONTROLLING ATTITUDE OF SPACECRAFT AND METHOD FOR CALCULATING CMG GIMBAL ANGLE

TECHNICAL FIELD

The present invention relates to an attitude control device for a spacecraft, which is configured to control an attitude of a spacecraft through use of control moment gyros (CMGs) installed in the spacecraft, and to a method of calculating gimbal angles of CMGs, for obtaining solutions of gimbal angles of the respective CMGs for achieving a given angular momentum of all the CMGs.

BACKGROUND ART

When CMGs are used to carry out three-axis attitude control of a spacecraft, three or more one-axis gimbal CMGs are often used. When a target value of an angular momentum of all the CMGs is given in such a system of the CMGs, inverse kinematics calculation for calculating gimbal angles of the respective CMGs that achieve such an angular momentum may be carried out. The angular momentum of all the CMGs corresponds to a vector sum of angular momentum vectors that the respective CMGs have.

On this occasion, for example, when motion planning for the CMGs is carried out, or the CMGs are used to carry out attitude control in real time, there is a need to obtain solutions of gimbal angles of the respective CMGs for achieving the given angular momentum of all the CMGs through inverse kinematics calculation (e.g., refer to Patent Literature 1).

Related art described in Patent Literature 1 uses iterative calculation, for example, the Newton's method, to obtain the solutions of the inverse kinematics calculation. Specifically, approximate solutions of the gimbal angles of the respective CMGs for achieving the given angular momentum of all the CMGs are obtained through a certain method, and the solutions of the gimbal angles for achieving the given angular momentum are obtained through use of the iterative calculation, for example, the Newton's method.

CITATION LIST

Patent Literature

[PTL 1] JP 2006-240375 A (line 36 on page 5 to line 14 on page 6, and lines 5 to 44 on page 10)

SUMMARY OF INVENTION

Technical Problem

However, the related art has the following problems.

As in the related art described in Patent Literature 1, when the solutions of the gimbal angles of the respective CMGs for achieving the given angular momentum of all the CMGs are obtained through the iterative calculation, for example, the Newton's method, the solutions are not always obtained. Therefore, the motion planning for the CMGs to achieve a desired attitude change cannot be carried out, and consequently, the attitude change may not be achieved.

Moreover, when the number of the CMGs is four or more, there are generally an infinite number of solutions of the gimbal angles of the respective CMGs for achieving the given angular momentum of all the CMGs. However, when the solutions of the gimbal angles of the respective CMGs are obtained through the iterative calculation, for example, the Newton's method, only solutions in neighborhoods of the approximate solutions of the gimbal angles calculated in advance can be obtained. Thus, it is not guaranteed that the solutions of the gimbal angles of the respective CMGs calculated in this way are solutions that minimize an evaluation function to be considered in terms of the attitude change out of the infinite number of solutions.

Further, in order to guarantee convergence of the iterative calculation, for example, the Newton's method, it is necessary to start the calculation based on a sufficiently precise approximate solution of the gimbal angle, but a method capable of positively calculating such an approximate solution has not necessarily been established.

The present invention has been made in view of the above-mentioned problems, and therefore has an object to provide an attitude control device for a spacecraft and a method of calculating gimbal angles of CMGs, which are capable of obtaining solutions of gimbal angles of respective CMGs for achieving a given angular momentum of all the CMGs even without using iterative calculation, for example, the Newton's method.

Solution to Problem

According to one embodiment of the present invention, there is provided an attitude control device for a spacecraft, which is configured to control an attitude of a spacecraft through use of a plurality of CMGs, the plurality of CMGs being installed in the spacecraft and each including a wheel configured to rotate about a spin axis, and a gimbal configured to support the wheel and to rotate about a gimbal axis orthogonal to the spin axis, the attitude control device including: an inverse kinematics calculation unit configured to obtain solutions of gimbal angles of the plurality of CMGs required for achieving a given angular momentum of all the plurality of CMGs; and a gimbal control torque calculation unit configured to feed back observed values of an attitude angle and an attitude angular velocity of the spacecraft, and observed values of the gimbal angles and gimbal angular velocities of the respective plurality of CMGs, to thereby calculate gimbal control torques of the respective plurality of CMGs required for achieving a desired attitude change in the spacecraft, in which: the gimbal control torque calculation unit is configured to calculate the gimbal control torques of the plurality of CMGs through use of the solutions of the gimbal angles of the plurality of CMGs obtained by giving the angular momentum of all the plurality of CMGs to the inverse kinematics calculation unit; and when a number of the plurality of CMGs is represented by n, where n is an integer of 4 or more, the inverse kinematics calculation unit sets (n−3) gimbal angles out of n gimbal angles corresponding to the n CMGs as free parameters, and uses an algebraic equation representing a relationship among three gimbal angles out of the n gimbal angles, the free parameters, and the angular momentum of all the plurality of CMGs to solve the algebraic equation while changing values of the free parameters within set ranges, to thereby obtain the solutions of the gimbal angles of the plurality of CMGs for achieving the given angular momentum of all the plurality of CMGs.

Further, according to one embodiment of the present invention: there is provided a method of calculating gimbal angles of CMGs, the method including the steps of: setting, when a number of the CMGs is represented by n, where n is an integer of 4 or more, (n−3) gimbal angles out of n gimbal angles corresponding to the n CMGs as free parameters; and using an algebraic equation representing a relationship among three gimbal angles out of the n gimbal angles, the free parameters, and an angular momentum of all the CMGs to solve the algebraic equation while changing values of the free parameters within set ranges, to thereby obtain solutions of the gimbal angles of the respective CMGs for achieving a given angular momentum of all the CMGs.

Advantageous Effects of Invention

According to the present invention, when the number of CMGs is represented by n (n is an integer of 4 or more), the (n–3) gimbal angles out of the n gimbal angles corresponding to the n CMGs are set as the free parameters, and the algebraic equation representing the relationship among the three gimbal angles out of then gimbal angles, the free parameters, and the angular momentum of all the CMGs is used to solve the algebraic equation while changing the free parameters within the set ranges, to thereby obtain the solutions of the gimbal angles of the respective CMGs for achieving the given angular momentum. Thus, it is possible to provide the attitude control device for a spacecraft and the method of calculating gimbal angles of CMGs, which are capable of obtaining solutions of gimbal angles of respective CMGs for achieving a given angular momentum of all the CMGs even without using iterative calculation, for example, the Newton's method.

DESCRIPTION OF EMBODIMENTS

Now, an attitude control device for a spacecraft and a method of calculating gimbal angles of CMGs according to exemplary embodiments of the present invention are described with reference to the accompanying drawings. In the illustration of the drawings, the same components or corresponding components are denoted by the same reference symbols, and the overlapping description thereof is herein omitted. Moreover, in the following embodiments, a case in which the spacecraft is an artificial satellite is exemplified, but the present invention can be applied also to other spacecrafts, for example, a spaceship.

First Embodiment

Figure 1:
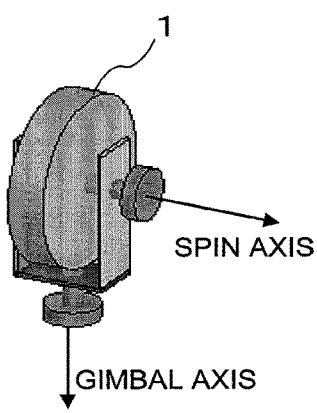
FIG. 1 is a perspective view for illustrating a schematic configuration of a CMG to be controlled by an attitude control device for a spacecraft according to a first embodiment of the present invention.

FIG. 1 is a perspective view for illustrating a schematic configuration of a CMG 1 to be controlled by an attitude control device 10 for a spacecraft according to a first embodiment of the present invention. In FIG. 1, the CMG 1 is an actuator used for attitude control of an artificial satellite, and is a one-axis gimbal CMG. Moreover, the CMG 1 includes a wheel configured to rotate at high speed about a spin axis, and a gimbal configured to support the wheel and to rotate about a gimbal axis orthogonal to the spin axis.

In the CMG 1, the wheel rotates at high speed, to thereby have a certain amount of an angular momentum about the spin axis. Moreover, the gimbal is rotated about the gimbal axis to rotate a direction of the angular momentum of the wheel, resulting in a large reaction torque acting on the entire artificial satellite. This reaction torque is used for the attitude control of the artificial satellite.

Figure 2:
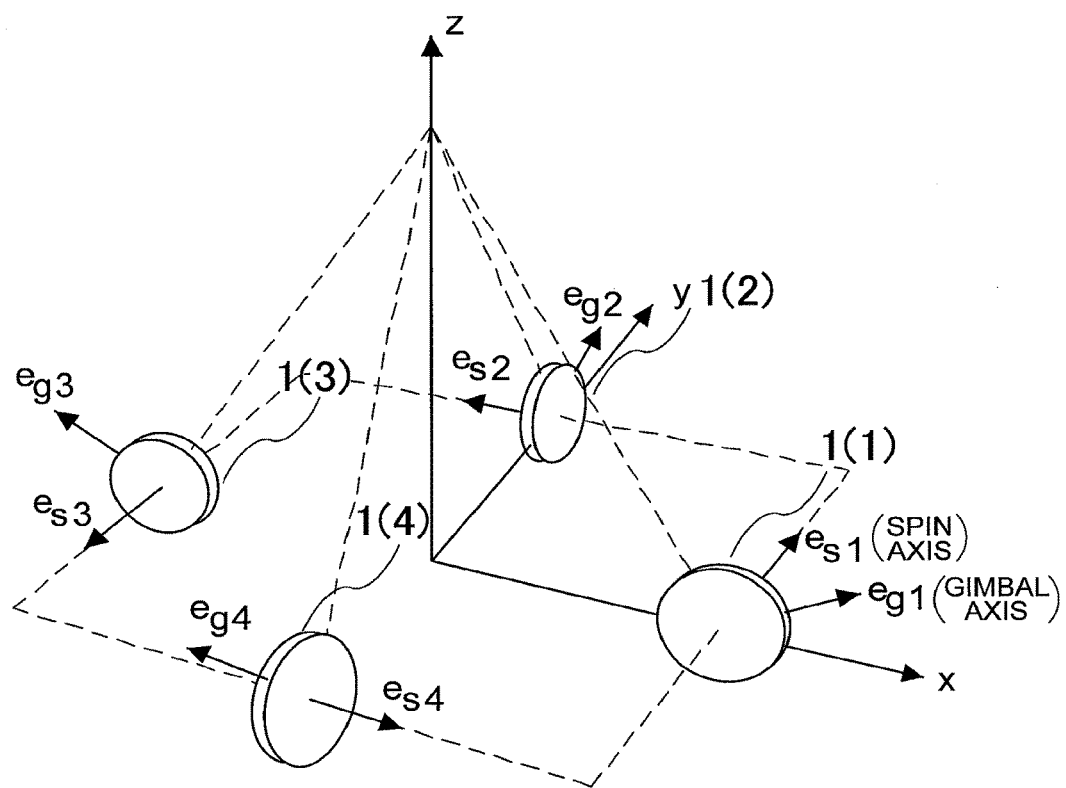
FIG. 2 is an explanatory diagram for illustrating an example of arrangement of a plurality of CMGs illustrated in FIG. 1 in an artificial satellite.

FIG. 2 is an explanatory diagram for illustrating an example of arrangement of a plurality of CMGs 1 illustrated in FIG. 1 in the artificial satellite. In FIG. 2, in general, four CMGs 1 are arranged in the artificial satellite as illustrated in FIG. 2, or four or more CMGs 1 are arranged therein. The plurality of CMGs 1 are operated in cooperation with one another, to thereby enable the attitude control of the artificial satellite. The arrangement of the CMGs 1 illustrated in FIG. 2 is such that each of the CMGs 1 is arranged on a base of a quadrangular pyramid, and is thus referred to as "pyramid arrangement". This arrangement is one of typical arrangement examples of the CMGs 1.

Figure 3:
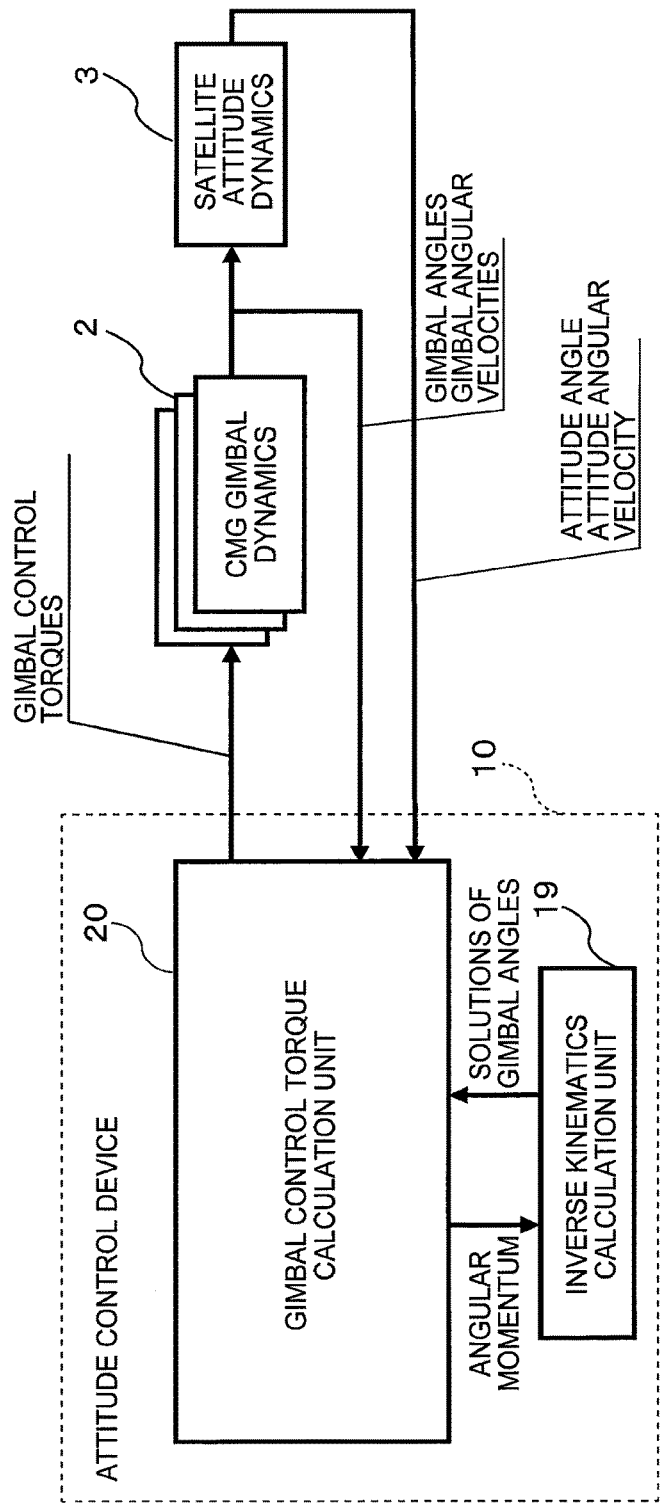
FIG. 3 is a block diagram for illustrating a configuration of the attitude control device for a spacecraft according to the first embodiment of the present invention.

FIG. 3 is a block diagram for illustrating a configuration of the attitude control device 10 for a spacecraft according to the first embodiment of the present invention. In FIG. 3, the attitude control device 10 for a spacecraft (hereinafter also abbreviated as "attitude control device 10") includes an inverse kinematics calculation unit 19 and a gimbal control torque calculation unit 20.

The gimbal control torque calculation unit 20 is configured to feed back observed values of an attitude angle and an attitude angular velocity of the artificial satellite, and observed values of gimbal angles and gimbal angular velocities of the respective CMGs 1, to thereby calculate gimbal control torques of the respective CMGs 1 required for achieving a desired attitude change in the artificial satellite. A specific configuration example of the gimbal control torque calculation unit 20 is described later.

The gimbal control torque calculation unit 20 needs to solve an inverse kinematics problem in the course of the calculation of the gimbal control torques. Thus, the gimbal control torque calculation unit 20 gives an angular momentum of all the CMGs 1 to the inverse kinematics calculation unit 19.

The inverse kinematics calculation unit 19 is configured to obtain solutions of the gimbal angles of the plurality of CMGs 1 required for achieving the angular momentum of all the CMGs 1 given from the gimbal control torque calculation unit 20. Herein, processing of obtaining the solutions of the gimbal angles of the respective CMGs 1 from the given angular momentum of all the CMGs 1 in the inverse kinematics calculation unit 19 is referred to as "inverse kinematics calculation".

The gimbal control torque calculation unit 20 uses the solutions of the gimbal angles of the plurality of CMGs 1 obtained by giving the angular momentum of all the CMGs 1 to the inverse kinematics calculation unit 19 to calculate gimbal control torques of the plurality of CMGs 1.

Figure 4:
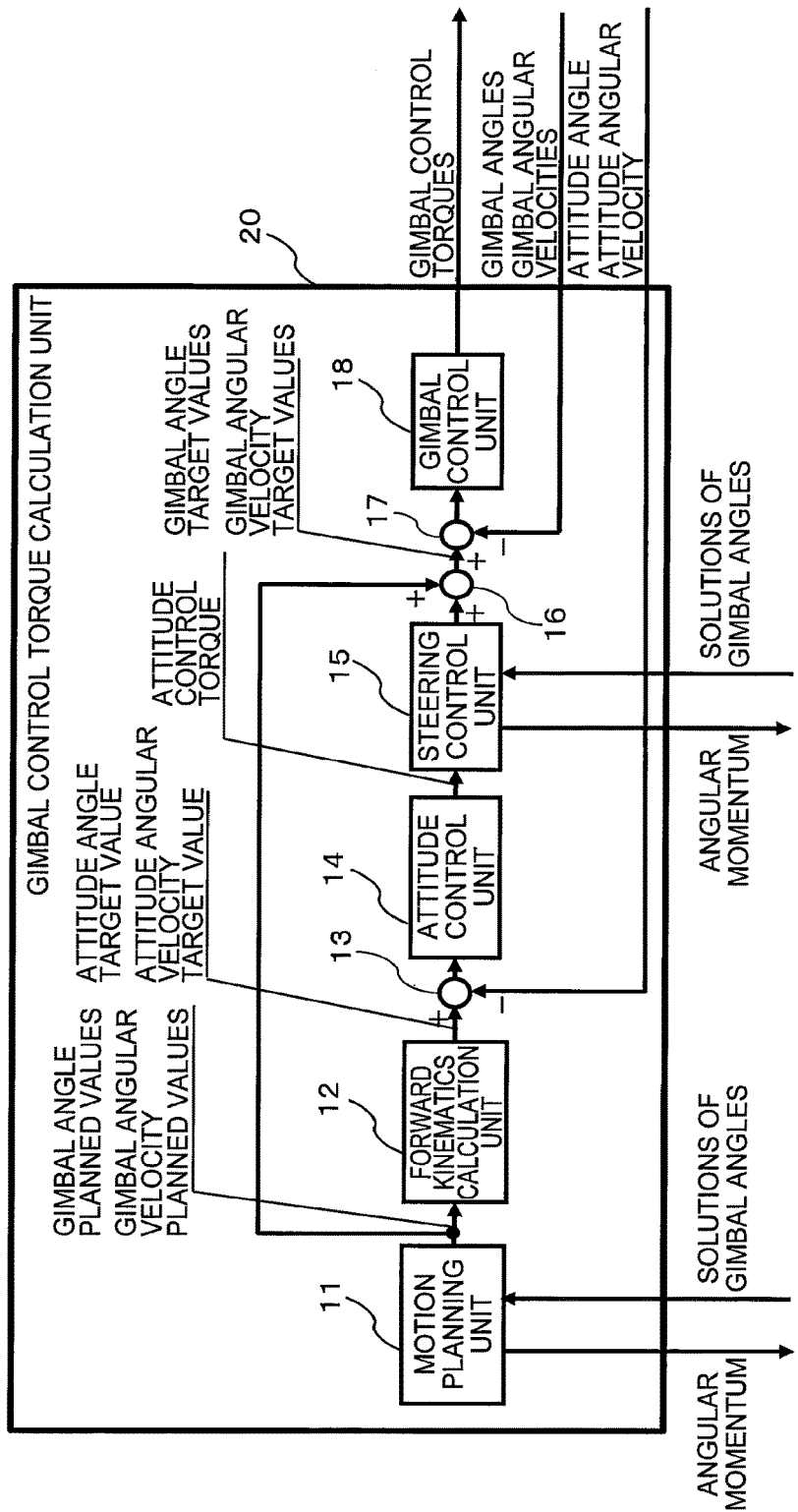
FIG. 4 is a block diagram for illustrating a configuration of a gimbal control torque calculation unit in the first embodiment of the present invention.

Referring to FIG. 4, a description is now given of a configuration of the gimbal control torque calculation unit 20. FIG. 4 is a block diagram for illustrating the configuration of the gimbal control torque calculation unit 20 in the first embodiment of the present invention.

In FIG. 4, the gimbal control torque calculation unit includes a motion planning unit 11, a forward kinematics calculation unit 12, a first subtractor 13, an attitude control unit 14, a steering control unit 15, an adder 16, a second subtractor 17, and a gimbal control unit 18.

Figure 5:
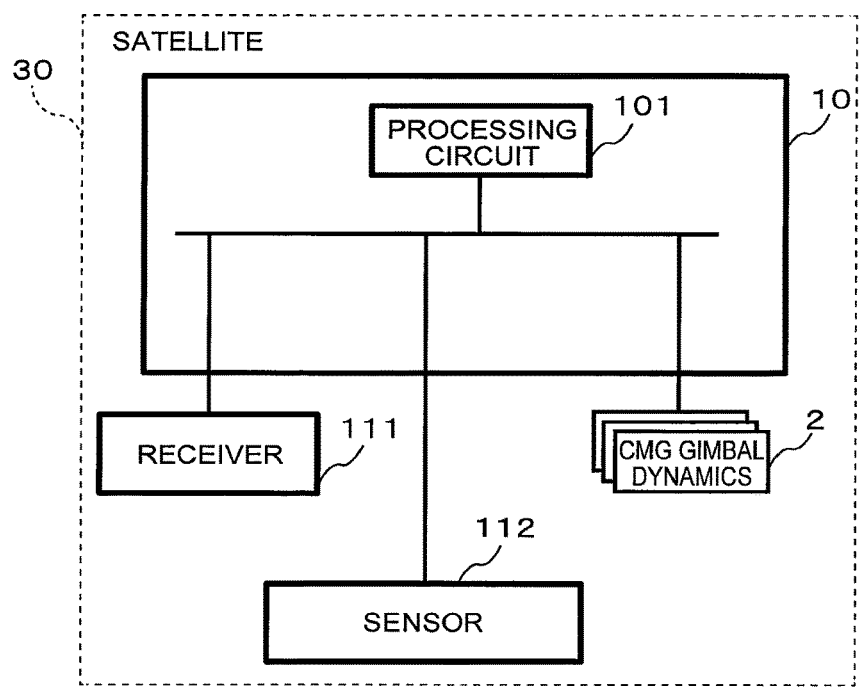
FIG. 5 is a configuration diagram for illustrating an example of a hardware configuration of the attitude control device for a spacecraft according to the first embodiment of the present invention.

Referring to FIG. 5, a description is now given of an example of a hardware configuration of the attitude control device 10. FIG. 5 is a configuration diagram for illustrating an example of the hardware configuration of the attitude control device 10 for a spacecraft according to the first embodiment of the present invention. In FIG. 5, an example in which the attitude control device 10 is implemented by a processing circuit 101 is illustrated.

In FIG. 5, a satellite 30 serving as the artificial satellite includes a receiver 111, a sensor 112, the attitude control device 10, and CMG gimbal dynamics 2. The receiver 111 is configured to receive information on a target value of an attitude change in the satellite 30 specified by a satellite user on the ground. The sensor 112 is configured to observe the attitude angle and the attitude angular velocity of the satellite 30.

The attitude control device 10 is configured to receive the signal from the receiver 111 to plan an attitude change trajectory, and further feeds back information on the attitude angle and the attitude angular velocity from the sensor 112, to thereby calculate the gimbal control torques for the respective CMGs 1 required to control the satellite 30.

The processing circuit may be dedicated hardware, or may be a central processing unit (CPU, also referred to as processing unit, calculation device, microprocessor, microcomputer, processor, or DSP) for executing programs stored in a memory.

Figure 6:
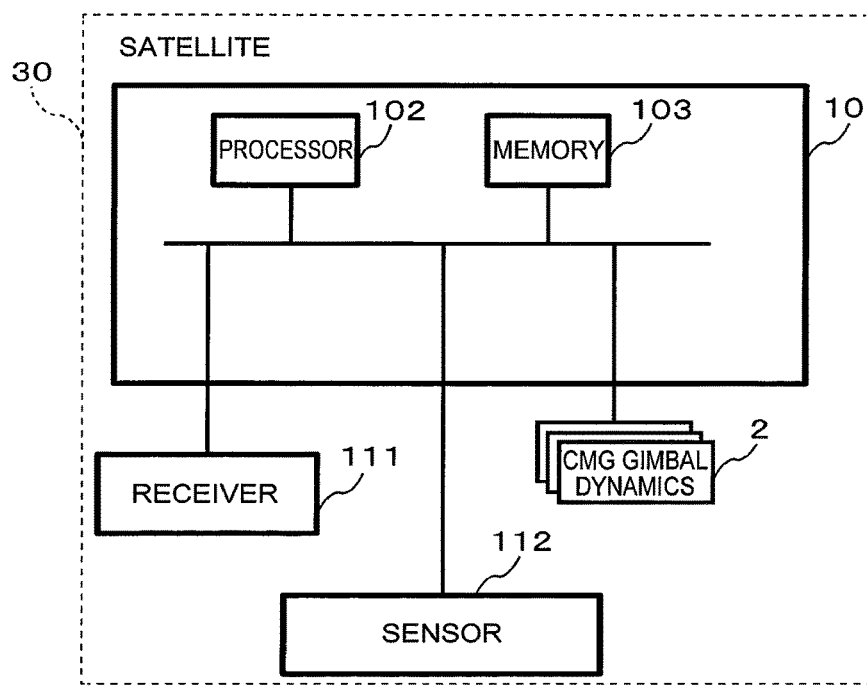
FIG. 6 is a configuration diagram for illustrating another example of the hardware configuration of the attitude control device for a spacecraft according to the first embodiment of the present invention.

Referring to FIG. 6, a description is now given of another example of the hardware configuration of the attitude control device 10. FIG. 6 is a configuration diagram for illustrating another example of the hardware configuration of the attitude control device 10 for a spacecraft according to the first embodiment of the present invention. In FIG. 6, an example in which the attitude control device 10 is implemented by a processor 102 and a memory 103 is illustrated. Moreover, the processing circuit 101 of FIG. 5 corresponds to the processor (CPU) 102 and the memory 103.

In FIG. 6, similarly to FIG. 5, the satellite 30 includes the receiver 111, the sensor 112, the attitude control device 10, and the CMG gimbal dynamics 2.

When the processing circuit 101 is dedicated hardware, for example, a single circuit, a complex circuit, a programmed processor, a parallel-programmed processor, an ASIC, an FPGA, or a combination thereof corresponds to the processing circuit 101. A function of each of the motion planning unit 11, the forward kinematics calculation unit 12, the attitude control unit 14, the steering control unit 15, and the gimbal control unit 18 may individually be implemented by the processing circuit, or the functions of the respective units may together be implemented by the processing circuit.

When the processing circuit is the processor (CPU) 102, the functions of the motion planning unit 11, the forward kinematics calculation unit 12, the first subtractor 13, the attitude control unit 14, the steering control unit 15, the adder 16, the second subtractor 17, the gimbal control unit 18, and the inverse kinematics calculation unit 19 are implemented by software, firmware, or a combination of software and firmware. The software and the firmware are described as programs, and are stored in the memory. The processing circuit reads out and executes the programs stored in the memory, to thereby implement the functions of the respective units.

In other words, the attitude control device 10 includes a memory for storing programs, the execution of which by the processing circuit 101 results in execution of a motion planning step, a forward kinematics calculation step, a first subtraction step, an attitude control step, a steering control step, an addition step, a second subtraction step, a gimbal control step, and an inverse kinematics calculation step. Moreover, those programs may also be considered to cause a computer to execute sequences and methods of the motion planning unit 11, the forward kinematics calculation unit 12, the first subtractor 13, the attitude control unit 14, the steering control unit 15, the adder 16, the second subtractor 17, the gimbal control unit 18, and the inverse kinematics calculation unit 19.

On this occasion, the memory corresponds to, for example, a nonvolatile or volatile semiconductor memory such as a RAM, a ROM, a flash memory, an EPROM, and an EEPROM, a magnetic disk, a flexible disk, an optical disc, a compact disc, a mini disc, or a DVD.

The memory stores, in addition to the above-mentioned programs, gimbal angle planned values and gimbal angular velocity planned values determined by the motion planning unit 11, an attitude angle target value and an attitude angular velocity target value set by the forward kinematics calculation unit 12, an attitude control torque calculated by the attitude control unit 14, gimbal angular velocity correction values calculated by the steering control unit 15, gimbal control torques calculated by the gimbal control unit 18, and the solutions of the gimbal angles calculated by the inverse kinematics calculation unit 19. Those pieces of information stored in the memory are appropriately read out to be used for the processing and corrected.

The respective functions of the motion planning unit 11, the forward kinematics calculation unit 12, the first subtractor 13, the attitude control unit 14, the steering control unit 15, the adder 16, the second subtractor 17, the gimbal control unit 18, and the inverse kinematics calculation unit 19 may partially be implemented by dedicated hardware, and may partially be implemented by software or firmware. For example, the function of the motion planning unit 11 is implemented by the processing circuit as dedicated hardware, and the function of the inverse kinematics calculation unit 19 may be implemented by the processing circuit reading out and executing a program stored in the memory. The processing circuit 101 of FIG. 5 corresponds to the processor 102 of FIG. 6, and the memory corresponds to the memory 103 of FIG. 6.

In this way, the processing circuit can implement the respective functions described above by hardware, software, firmware, or a combination of those. A description is now given of operations of respective units of the attitude control device 10.

Returning to FIG. 4, when a target value of the attitude change in the artificial satellite is given to the gimbal control torque calculation unit 20 of the attitude control device 10, the motion planning unit 11 carries out motion planning for the respective CMGs 1 to be used when the artificial satellite changes the attitude in accordance with the attitude change target value. Specifically, the motion planning unit 11 calculates motion trajectories of the gimbal angles of the respective CMGs 1 conforming to the input attitude change target value as the gimbal angle planned values and the gimbal angular velocity planned values. Moreover, the motion planning unit 11 outputs the calculated gimbal angle planned values and gimbal angular velocity planned values of the respective CMGs 1 to the forward kinematics calculation unit 12 and the adder 16.

Moreover, the motion planning unit 11 needs to solve the inverse kinematics problem in the course of the calculation of the motion plans for the CMGs 1. Thus, the motion planning unit 11 outputs the angular momentum of all the CMGs 1 to the inverse kinematics calculation unit 19, and uses the gimbal angles of the respective CMGs 1 returned from the inverse kinematics calculation unit 19 to carry out the motion planning.

The motion planning unit 11 may be processed by the processing circuit 101 or the processor 102, or may be implemented by an independent processing circuit. Moreover, the motion planning unit 11 reads out the target value of the attitude change in the artificial satellite and the like from the memory, and stores the calculated gimbal angle planned values and gimbal angular velocity planned values in the memory.

Figure 7:
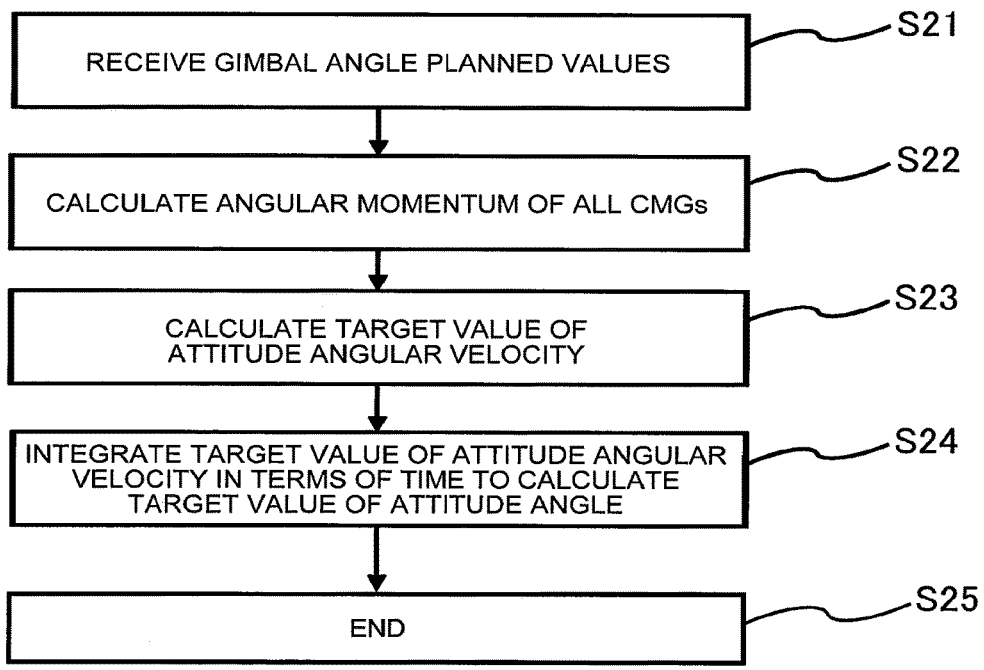
FIG. 7 is a flowchart for illustrating an operation of a forward kinematics calculation unit in the first embodiment of the present invention.

Referring to FIG. 7, a description is now given of the forward kinematics calculation unit 12. FIG. 7 is a flowchart for illustrating an operation of the forward kinematics calculation unit 12 in the first embodiment of the present invention.

When the gimbal angle planned values of the respective CMGs 1 are given to the forward kinematics calculation unit 12, the forward kinematics calculation unit 12 receives the given gimbal angle planned values of the respective CMGs 1 (Step S21), and calculates, from the input gimbal angle planned values of the respective CMGs 1, the angular momentum of all the CMGs 1 for achieving those gimbal angles (Step S22). Herein, processing of obtaining the solution of the angular momentum of all the CMGs 1 from the input gimbal angle planned values of the respective CMGs 1 in the forward kinematics calculation unit 12 is referred to as "forward kinematics calculation".

In the configuration of FIG. 4, the forward kinematics calculation unit 12 calculates, from the gimbal angle planned values of the respective CMGs 1 input from the motion planning unit 11, the angular momentum of all the CMGs 1 with which those planned values can be achieved.

Moreover, the forward kinematics calculation unit 12 calculates the target value of the attitude angular velocity of the artificial satellite from the angular momentum of all the CMGs 1 calculated in Step S22 (Step S23). The total angular momentum is conserved in an inertial space in the entire artificial satellite including the CMGs 1, and hence the target value of the attitude angular velocity of the artificial satellite can be defined from the angular momentum of all the CMGs 1 in this way.

The forward kinematics calculation unit 12 integrates, in terms of time, the target value of the attitude angular velocity calculated in Step S23 to calculate the target value of the attitude angle of the artificial satellite (Step S24), and finishes the series of processing steps (Step S25). The attitude angle target value and the attitude angular velocity target value of the artificial satellite calculated as described above are output to the first subtractor 13.

The forward kinematics calculation unit 12 may be processed by the processing circuit 101 or the processor 102, or may be implemented by an independent processing circuit. Moreover, the forward kinematics calculation unit 12 reads out the gimbal angle planned values and the gimbal angular velocity planned values calculated by the motion planning unit 11 from the memory, and stores the calculated attitude angle target value and attitude angular velocity target value in the memory.

The first subtractor 13 is configured to calculate respective differences between the attitude angle target value and the attitude angular velocity target value of the artificial satellite input from the forward kinematics calculation unit 12 and an attitude angle and an attitude angular velocity of the artificial satellite input from satellite attitude dynamics 3, and output the differences to the attitude control unit 14. The attitude angle and the attitude angular velocity of the artificial satellite input from the satellite attitude dynamics 3 correspond to observed values of the attitude angle and the attitude angular velocity of the artificial satellite.

The attitude control unit 14 is configured to calculate the attitude control torque for controlling the attitude of the artificial satellite so that the differences input from the first subtractor 13 become 0, and output the attitude control torque to the steering control unit 15. Feedback control is carried out from the differences input from the first subtractor 13 in this way so that the attitude angle of the artificial satellite approaches the attitude angle target value, and the attitude angular velocity of the artificial satellite approaches the attitude angular velocity target value.

In this way, the attitude control unit 14 calculates and outputs the attitude control torque for controlling the attitude of the artificial satellite from the attitude angle target value and the attitude angular velocity target value of the artificial satellite, which are input from the forward kinematics calculation unit 12, and the observed values of the attitude angle and the attitude angular velocity of the artificial satellite.

The attitude control unit 14 may be processed by the processing circuit 101 or the processor 102, or may be implemented by an independent processing circuit. Moreover, the attitude control unit 14 reads out the differences input from the first subtractor 13 from the memory, and stores the calculated attitude control torque in the memory.

The steering control unit 15 is configured to calculate, from the attitude control torque input from the attitude control unit 14, gimbal angle correction values and gimbal angular velocity correction values for the respective CMGs 1 matching the input attitude control torque, and output the gimbal angle correction values and the gimbal angular velocity correction values to the adder 16.

Moreover, the steering control unit 15 needs to solve an inverse kinematics problem in the course of its calculation. Thus, the steering control unit 15 outputs the angular momentum of all the CMGs 1 to the inverse kinematics calculation unit 19, and uses the gimbal angles of the respective CMGs 1 returned from the inverse kinematics calculation unit 19 to calculate the gimbal angle correction values and the gimbal angular velocity correction values.

The steering control unit 15 may be processed by the processing circuit 101 or the processor 102, or may be implemented by an independent processing circuit. Moreover, the steering control unit 15 stores the calculated gimbal angle correction values and the gimbal angular velocity correction values in the memory.

The adder 16 is configured to add the gimbal angle correction values and the gimbal angular velocity correction values of the respective CMGs 1 input from the steering control unit 15 to the gimbal angle planned values and the gimbal angular velocity planned values of the respective CMGs 1 input from the motion planning unit 11, respectively. Moreover, the adder 16 outputs to the second subtractor 17 the calculated sums as gimbal angle target values and gimbal angular velocity target values of the respective CMGs 1.

The second subtractor 17 is configured to calculate respective differences between the gimbal angle target values and the gimbal angular velocity target values of the respective CMGs 1 input from the adder 16, and gimbal angles and gimbal angular velocities of the respective CMGs 1 input from the CMG gimbal dynamics 2, and output the differences to the gimbal control unit 18. The gimbal angles and the gimbal angular velocities of the respective CMGs 1 input from the CMG gimbal dynamics 2 correspond to observed values of the gimbal angles and the gimbal angular velocities of the respective CMGs 1, respectively.

The gimbal control unit 18 is configured to calculate the gimbal control torques for controlling the rotations of the gimbals of the respective CMGs 1 so that the differences input from the second subtractor 17 become 0, and output the gimbal control torques to the CMG gimbal dynamics 2. Feedback control is carried out from the differences input from the second subtractor 17 in this way so that the gimbal angles of the respective CMGs 1 approach the gimbal angle target values, and the gimbal angular velocities of the respective CMGs 1 approach the gimbal angular velocity target values.

Therefore, the appropriate gimbal control torques are given to the respective CMGs 1, and reaction torques of those gimbal control torques are given to the satellite attitude dynamics 3. As a result of the provision of the reaction torques, the artificial satellite is controlled so that the attitude angle and the attitude angular velocity follow the attitude angle target value and the attitude angular velocity target value, respectively.

In this way, the gimbal control unit 18 calculates and outputs the gimbal control torques of the respective CMGs 1 from the gimbal angle target values and the gimbal angular velocity target values of the respective CMGs 1 input from the adder 16 and the observed values of the gimbal angles and the gimbal angular velocities of the respective CMGs 1.

The gimbal control unit 18 may be processed by the processing circuit 101 or the processor 102, or may be implemented by an independent processing circuit. Moreover, the gimbal control unit 18 stores the calculated gimbal control torques of the respective CMGs 1 in the memory.

A description is now given of the inverse kinematics calculation carried out by the inverse kinematics calculation unit 19. As described above, the forward kinematics calculation unit 12 applies the forward kinematics calculation to the input gimbal angles of the respective CMGs 1, to thereby calculate the angular momentum of all the CMGs 1. This forward kinematics calculation can easily be carried out, and the solution of the forward kinematics calculation, namely, the angular momentum of all the CMGs 1 is uniquely determined.

In contrast, the solutions of the inverse kinematics calculation, namely, solutions of the gimbal angles of the respective CMGs 1 are not usually uniquely determined, and a method of strictly obtaining the solutions is not known, either. For example, the following two points are specifically given as the necessity for the attitude control device 10 to carry out such inverse kinematics calculation. That is, firstly, when the motion planning unit 11 calculates the motion trajectories of the gimbal angles of the respective CMGs 1, the solutions of the inverse kinematics calculation may be necessary. Secondly, when the steering control unit 15 calculates the gimbal angle correction values and the gimbal angular velocity correction values of the respective CMGs 1, the solutions of the inverse kinematics calculation may be necessary.

Thus, in general, the inverse kinematics calculation is carried out through iterative calculation, for example, the Newton's method. Specifically, in general, values of the gimbal angles of the respective CMGs 1 for approximately achieving the given angular momentum of all the CMGs 1 are obtained through a certain method, and the solutions of the gimbal angles for achieving the given angular momentum are obtained through the iterative calculation, for example, the Newton's method.

The attitude control device for a spacecraft according to the present invention has a technical feature in that the attitude control device includes the inverse kinematics calculation unit capable of strictly carrying out the inverse kinematics calculation without using the iterative calculation, for example, the Newton's method. A further description is now given of the inverse kinematics calculation carried out by the inverse kinematics calculation unit 19.

When the number of the CMGs 1 arranged in the artificial satellite, namely, the number of the CMGs 1 controlled by the attitude control device 10 is equal to or more than 3, and the angular momentum of all the CMGs 1 has a magnitude that can be achieved, the solutions of the gimbal angles of the respective CMGs 1 for achieving the angular momentum exist. However, when the number of the CMGs 1 is n (n is an integer of 4 or more), solutions of the gimbal angles of (n−3) CMGs 1 are not always uniquely determined.

Herein, the (n−3) gimbal angles whose solutions are not always uniquely determined are collectively referred to as "free parameters $\theta_f$". In the present invention, such a concept as the free parameters $\theta_f$ is newly introduced.

When the values of the free parameters $\theta_f$ are appropriately determined, the remaining three gimbal angles $\theta_j$ (j=1, 2, 3) except the (n−3) gimbal angles need to satisfy an algebraic equation of the following expression (1).

$$\Sigma_j(a_{ij}\sin\theta_j + b_{ij}\cos\theta_j) = h_i \quad (i=1,2,3) \tag{1}$$

In the expression (1), $h_i$ is a known value obtained by subtracting an amount of the free parameter $\theta_f$ from each component value of the angular momentum of all the CMGs 1. Moreover, $a_{ij}$ and $b_{ij}$ are coefficients determined by the arrangement of the respective CMGs 1, and are known when the arrangement of the respective CMGs 1 is determined. Unknown amounts of the expression (1) are the three gimbal angles $\theta_j$ (j=1, 2, 3), but the following relational expression (2) holds true between $\sin\theta_1$ and $\cos\theta_1$ as is well known.

$$\sin^2\theta_j + \cos^2\theta_j = 1 \quad (j=1,2,3) \tag{2}$$

On this occasion, when $\sin\theta_j$ and $\cos\theta_j$ are considered as unknown amounts, the expressions (1) and (2) are six expressions for six unknown amounts. Those expressions are simultaneous algebraic equations, and hence it is generally not easy to obtain solutions. Thus, when a coordinate system expressing the angular momentum of all the CMGs 1 is appropriately set, $a_{ij}$ and $b_{ij}$ can be expressed in a simple form including 0. In this case, the equations can be converted to algebraic equations having one variable including any one of the variables of $\sin\theta_j$ and $\cos\theta_j$.

A solution of an algebraic equation having one variable can easily be obtained, and hence the solution can be used to obtain the other variables, to thereby finally obtain solutions of all the variables. This calculation includes calculation of obtaining the solution of the algebraic equation, but solutions strictly satisfying the angular momentum of all the CMGs 1 can be obtained without iterative calculation that uses approximate values of the solutions as in the Newton's method.

Moreover, the values of the free parameters $\theta_f$ are any values, and the values of the free parameters $\theta_f$ are the solutions of the (n−3) gimbal angles as they are. Thus, a plurality of sets of the solutions of the gimbal angles of the respective CMGs 1 can be obtained by calculating the three gimbal angles $\theta_j$ (j=1, 2, 3) for each of the free parameters $\theta_f$ after being changed while the value of each of the free parameters $\theta_f$ is being changed within a set range. The set range is a range in which the value of the free parameter $\theta_f$ can change, and how to change the value of the free parameter $\theta_f$ only needs to be designed in advance.

As a result, the solutions of all the gimbal angles for achieving the angular momentum of all the CMGs 1 can be obtained in principle. Moreover, when an evaluation function, which is an index for evaluating the most appropriate solutions out of an infinite number of solutions, is used to select one set of the solutions of the gimbal angles of the respective CMGs 1 out of the plurality of sets of the solutions of the gimbal angles of the respective CMGs 1, optimal solutions of the respective CMGs 1 satisfying the angular momentum of all the CMGs 1 can be obtained. In order to identify one set of the optimal solutions of the gimbal angles of the respective CMGs 1 from the plurality of sets of the solutions of the gimbal angles of the respective CMGs 1, for example, a publicly known evaluation function only needs to be used.

In this way, the (n−3) gimbal angles, which are excessive degrees of freedom for the inverse kinematics calculation, are given as the free parameters $\theta_f$ in advance to the inverse kinematics calculation unit 19, and hence the gimbal angles of the respective CMGs 1 can uniquely be determined under a state in which the excessive degrees of freedom do not exist.

A description is now given of the inverse kinematics calculation for a case of n=4 as a specific example. In this specific example, as illustrated in FIG. 2, a coordinate system xyz fixed to the artificial satellite is considered, and it is assumed that a CMG 1(1) and a CMG 1(3) are positioned on ±x axes and a CMG 1(2) and a CMG 1(4) are positioned on ±y axes. Moreover, it is assumed that respective directions of gimbal axes $e_{g1}$, $e_{g2}$, $e_{g3}$, and $e_{g4}$ are inclined by an angle $\beta$ from a +z axis. Moreover, it is assumed that, when gimbal angles $\theta_1$, $\theta_2$, $\theta_3$, and $\theta_4$ are 0, spin axes $e_{s1}$, $e_{s2}$, $e_{s3}$, and $e_{s4}$ match +y, −x, −y, and +x directions, respectively.

When the coordinate system is set in this way, and the gimbal angles of the respective CMGs 1 are $\theta_1$, $\theta_2$, $\theta_3$, and $\theta_4$, $H_1$, $H_2$, and $H_3$, which are x, y, and z components of the angular momentum of all the CMGs 1, are expressed by the following expression (3).

$$-h\cos\beta\sin\theta_1 - h\cos\theta_2 + h\cos\beta\sin\theta_3 + h\cos\theta_4 = H_1$$

$$h\cos\theta_1 - h\cos\beta\sin\theta_2 - h\cos\theta_3 + h\cos\beta\sin\theta_4 = H_2$$

$$h\sin\beta\sin\theta_1 - h\sin\beta\sin\theta_2 + h\sin\beta\sin\theta_3 + h\sin\beta\sin\theta_4 = H_3 \tag{3}$$

In the expression (3), h is the magnitude of the angular momentum that each of the CMGs 1 has, and is constant. When the four CMGs 1 exist, the arrangement of the coordinate system in the pyramid arrangement illustrated in FIG. 2 and the expression (3) are publicly known.

Then, n is 4, that is, the number of CMGs 1 is 4, and hence the dimensions of the free parameters $\theta_f$ is 1 (=4−3), and $\theta_f = \theta_4$. On this occasion, when $h_1$, $h_2$, and $h_3$ are obtained by subtracting an amount of the free parameter $\theta_f$ from the respective components $H_1$, $H_2$, and $H_3$ of the angular momentum of all the CMGs 1, $h_1$, $h_2$, and $h_3$ are expressed by the following expression (4).

$$h_1 = H_1 - h\cos\theta_4$$

$$h_2 = H_2 - h\cos\beta\sin\theta_4$$

$$h_3 = H_3 - h\sin\beta\sin\theta_4 \tag{4}$$

Moreover, when the expression (4) is assigned to the expression (3), the result is expressed as the following expression (5). The expression (5) corresponds to the expression (1).

$$-h\cos\beta\sin\theta_1 - h\cos\theta_2 + h\cos\beta\sin\theta_3 = h_1$$

$$h\cos\theta_1 - h\cos\beta\sin\theta_2 - h\cos\theta_3 = h_2$$

$$h\sin\beta\sin\theta_1 + h\sin\beta\sin\theta_2 + h\sin\beta\sin\theta_3 = h_3 \tag{5}$$

Further, the expression (5) is transformed to the following expression (6).

$$\sin\theta_1 - \sin\theta_3 = -\frac{1}{\cos\beta}\left(\frac{h_1}{h} + \cos\theta_2\right) \tag{6}$$

$$\cos\theta_1 - \cos\theta_3 = \frac{h_2}{h} + \cos\beta\sin\theta_2$$

$$\sin\theta_1 + \sin\theta_3 = \frac{1}{\sin\beta}\left(\frac{h_3}{h} - \sin\beta\sin\theta_2\right)$$

An identical equation expressed as the following expression (7) is generally holds true for any two angles $\varphi_1$ and $\varphi_2$.

$$[(\cos\varphi_1 - \cos\varphi_2)^2 + (\sin\varphi_1 - \sin\varphi_2)^2] \times [(\cos\varphi_1 - \cos\varphi_2)^2 + (\sin\varphi_1 + \sin\varphi_2)^2] = 4(\cos\varphi_1 - \cos\varphi_2)^2 \quad (7)$$

When $\varphi_1$ is replaced by $\theta_1$, $\varphi_2$ is replaced by $\theta_3$, and the expression (6) is assigned to the expression (7), the result is expressed as the following expression (8).

$$\left[\left(\frac{h_2}{h} + \cos\beta\sin\theta_2\right)^2 + \frac{1}{\cos^2\beta}\left(\frac{h_1}{h} + \cos\theta_2\right)^2\right] \times \quad (8)$$

$$\left[\left(\frac{h_2}{h} + \cos\beta\sin\theta_2\right)^2 + \frac{1}{\sin^2\beta}\left(\frac{h_3}{h} - \sin\beta\sin\theta_2\right)^2\right] = 4\left(\frac{h_2}{h} + \cos\beta\sin\theta_2\right)^2$$

Moreover, a relational expression of "$\sin^2\theta_2 + \cos^2\theta_2 = 1$" holds true in accordance with the expression (2), and hence a relational expression (9) is obtained from the expression (8) based on this relational expression.

$$\frac{1}{\cos^2\beta}\left(\frac{2h_1}{h}\right)\cos\theta_2\left[\left(\frac{h_2}{h} + \cos\beta\sin\theta_2\right)^2 + \frac{1}{\sin^2\beta}\left(\frac{h_3}{h} - \sin\beta\sin\theta_2\right)^2\right] = \quad (9)$$

$$4\left(\frac{h_2}{h} + \cos\beta\sin\theta_2\right)^2 -$$

$$\left[\left(\frac{h_2}{h} + \cos\beta\sin\theta_2\right)^2 + \frac{1}{\cos^2\beta}\left(\frac{h_1^2}{h^2} + 1 - \sin^2\theta_2\right)\right] \times$$

$$\left[\left(\frac{h_2}{h} + \cos\beta\sin\theta_2\right)^2 + \frac{1}{\sin^2\beta}\left(\frac{h_3}{h} - \sin\beta\sin\theta_2\right)^2\right]$$

In the expression (9), the left side is a product of a quadratic expression of $\sin\theta_2$ and $\cos\theta_2$, and the right side is a quadratic expression of $\sin\theta_2$. Thus, an eighth-degree polynomial equation of $\sin\theta_2$ is obtained by squaring both sides of the expression (9). In other words, the expression is converted to the algebraic equation having one variable including only $\sin\theta_2$ by appropriately setting the coordinate system expressing the angular momentum of all the CMGs 1. The solutions of the gimbal angles $\theta_1$ and $\theta_3$ can be obtained by using a solution of the gimbal angle $\theta_2$ obtained by solving the algebraic equation having one variable including only $\sin\theta_2$.

Moreover, a plurality of sets of the combinations of the solutions of the gimbal angles of the respective CMGs for achieving the given angular momentum can be calculated by calculating the three gimbal angles $\theta_1$, $\theta_2$, and $\theta_3$ for each value of the free parameter $\theta_4$ after being changed while the value of the free parameter $\theta_4$ is being changed within the set range.

The solutions of the gimbal angles of the plurality of CMGs 1 required for achieving the given angular momentum of all the CMGs 1 can be obtained by solving the algebraic equation expressing the relationship among the three gimbal angles out of the n gimbal angles, the free parameter $\theta_f$, and the angular momentum of all the CMGs 1 through the inverse kinematics calculation by the inverse kinematics calculation unit 19 while the value of the free parameter $\theta_f$ is being changed within the set range.

The inverse kinematics calculation unit 19 may be processed by the processing circuit 101 or the processor 102, or may be implemented by an independent processing circuit. Moreover, the inverse kinematics calculation unit 19 reads out the angular momentum of all the CMGs 1 from the memory, and stores the calculated solutions of the gimbal angles of the respective CMGs 1 in the memory.

As described above, according to the first embodiment, the solutions of the gimbal angles of the plurality of CMGs required for achieving the given angular momentum is obtained by setting the (n−3) gimbal angles of the excessive degrees of freedom out of the n gimbal angles corresponding to the n CMGs as the free parameters, and solving the algebraic equation expressing the relationship among the three gimbal angles out of then gimbal angles, the free parameters, and the angular momentum of all the CMGs while the values of the free parameters are being changed within the set ranges.

As a result, the solutions of the gimbal angles of the respective CMGs for achieving the given angular momentum of all the CMGs can precisely be calculated even without using the iterative calculation, for example, the Newton's method. Moreover, when the angular momentum of all the CMGs is given, all the solutions of the gimbal angles of the respective CMGs for satisfying this angular momentum can be calculated, and an efficient and smooth attitude change can be achieved by selecting the combination of the solutions that minimizes the evaluation function out of the solutions of the gimbal angles and then using the solutions to carry out the attitude control.

Second Embodiment

In a second embodiment of the present invention, a description is given of a case in which the minimum drive period exhibited when the motion planning unit 11 carries out the attitude change in the artificial satellite is calculated through use of the inverse kinematics calculation carried out by the inverse kinematics calculation unit 19. In the second embodiment, a description is omitted for the same points as those of the first embodiment, and a description is mainly given of differences from the first embodiment.

Figure 8:
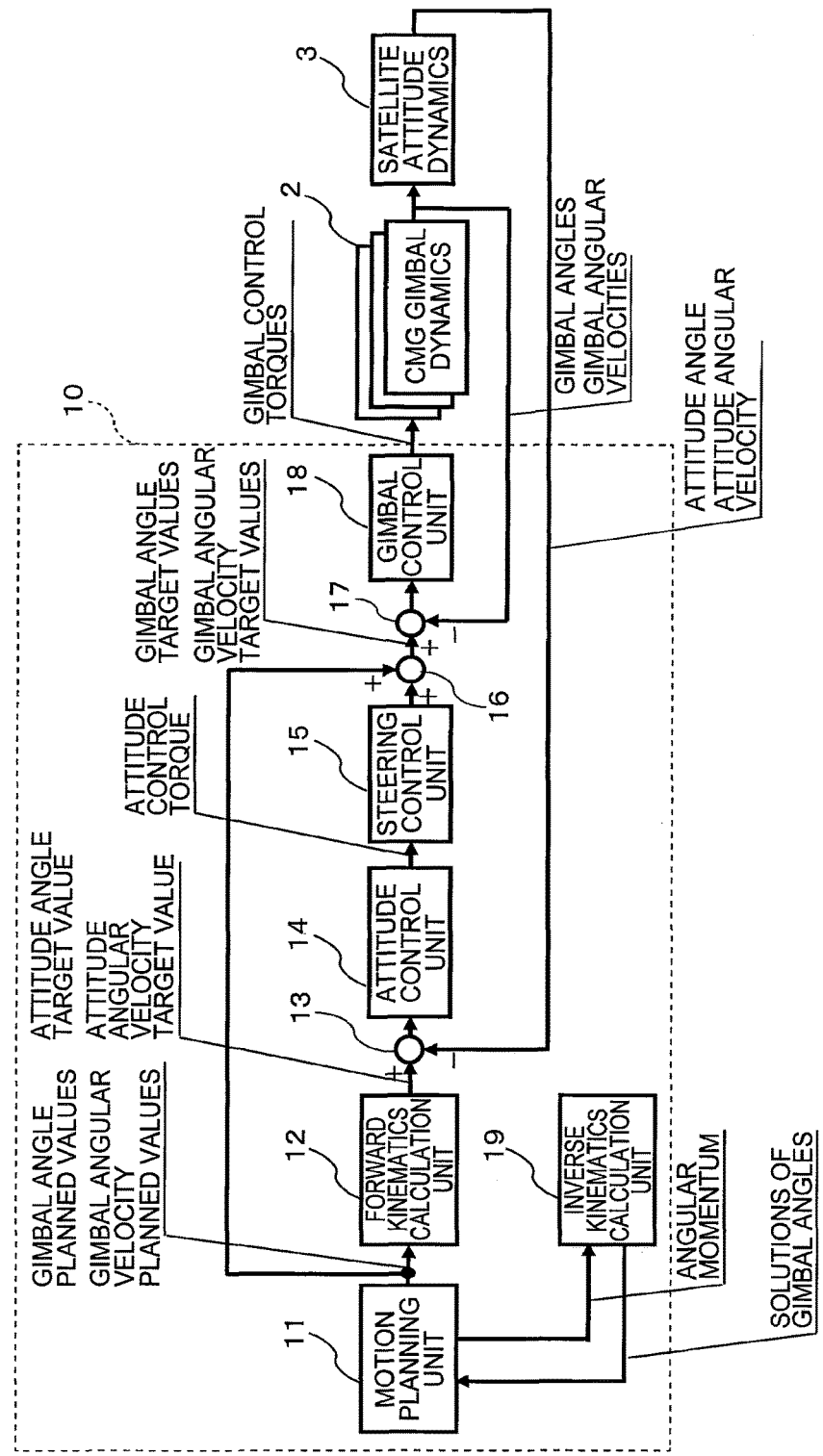
FIG. 8 is a block diagram for illustrating a configuration of an attitude control device for a spacecraft according to a second embodiment of the present invention.

FIG. 8 is a block diagram for illustrating a configuration of the attitude control device 10 for a spacecraft according to the second embodiment of the present invention. In FIG. 8, the motion planning unit 11 is configured to calculate the minimum drive period exhibited when an attitude change in the artificial satellite is carried out.

Figure 9:
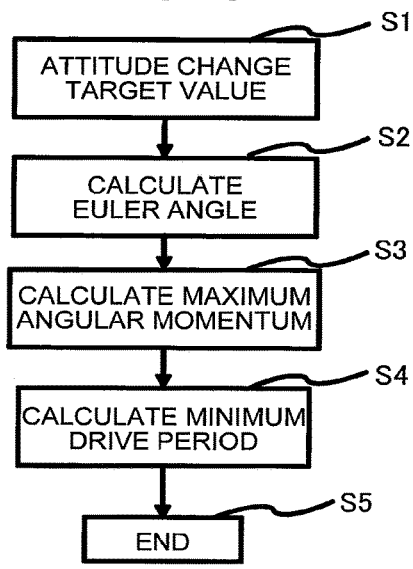
FIG. 9 is a flowchart for illustrating a sequence to be carried out when the attitude control device for a spacecraft according to the second embodiment of the present invention calculates a minimum drive period exhibited when an attitude change in the artificial satellite is carried out.

Referring to FIG. 9, a description is now given of the calculation of the minimum drive period carried out by the motion planning unit 11. FIG. 9 is a flowchart for illustrating a sequence to be carried out when the attitude control device 10 for a spacecraft according to the second embodiment of the present invention calculates the minimum drive period exhibited when an attitude change in the artificial satellite is carried out.

On this occasion, as illustrated in FIG. 9, when an attitude change target value of the artificial satellite is input (Step S1), the attitude change achieved by a rotation about one axis is considered. Such a rotation axis is referred to as "Euler axis". The motion planning unit 11 calculates the Euler axis from the attitude change target value given in Step S1 (Step S2). This Euler axis can be obtained through simple calculation from the attitude change target value.

When a unit vector in the direction of the Euler angle is represented by $\alpha$, the motion planning unit 11 sets the angular momentum of all the CMGs 1 to the direction of the unit vector $\alpha$, and calculates the maximum angular momentum that can be generated by all the CMGs 1 in this direction (Step S3). Moreover, the motion planning unit 11 calculate an approximate minimum drive period from the maximum angular momentum calculated in Step S3 (Step S4), and finishes the series of processing steps (Step S5).

In this way, the attitude control device 10 follows the sequence illustrated in FIG. 9 to calculate the maximum angular momentum that can be generated by all the CMGs in the direction of the attitude change axis when the artificial satellite carries out the attitude change, and uses the calculation result to calculate the minimum drive period exhibited when the artificial satellite carries out the attitude change.

On this occasion, the attitude control device 10 according to the second embodiment has a technical feature in that the inverse kinematics calculation carried out by the inverse kinematics calculation unit 19 is used to calculate the maximum angular momentum in Step S3 of FIG. 9.

Figure 10:
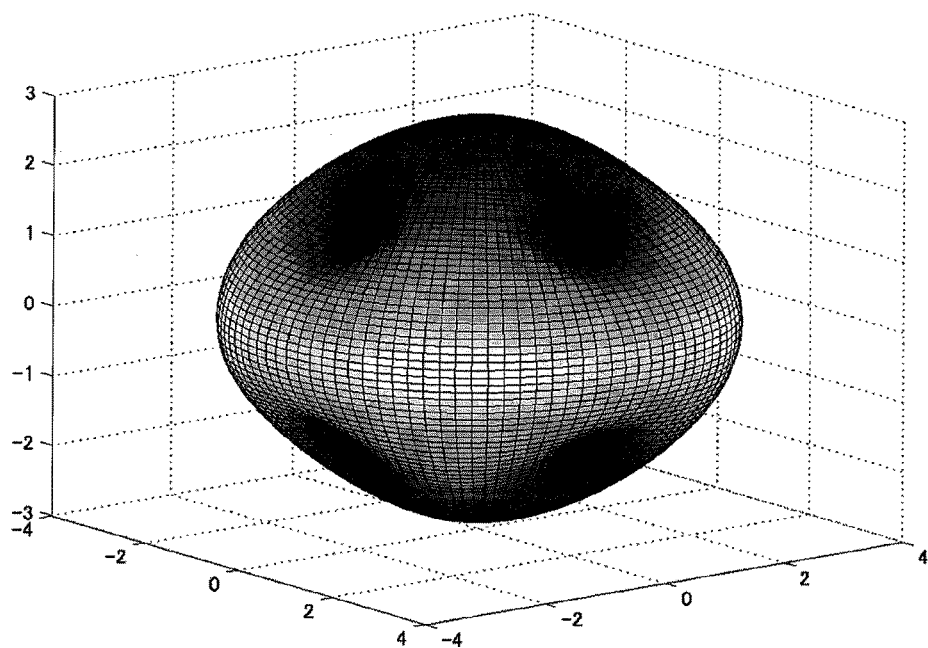
FIG. 10 is an explanatory diagram for illustrating an angular momentum envelope of all the CMGs for four CMGs of FIG. 2.

FIG. 10 is an explanatory diagram for illustrating an angular momentum envelope of all the CMGs 1 for the four CMGs 1 of FIG. 2. In FIG. 10, the maximum angular momentum that can be taken by all the CMGs 1 is three-dimensionally illustrated.

On this occasion, the calculation of the maximum angular momentum of the CMGs 1 in Step S3 of FIG. 9 corresponds to calculation of, when the direction of the angular momentum is defined, the magnitude of the angular momentum on the angular momentum envelope in that direction.

As illustrated in FIG. 10, the angular momentum envelope has a complex shape, and hence the calculation of the maximum angular momentum is not always easy. In general, a vector referred to as a singular vector corresponding to the direction of the angular momentum is calculated, to thereby calculate the value on the angular momentum envelope. However, the direction of the angular momentum and the singular vector do not always correspond to each other in a one-to-one manner, and there has not been found a method of positively finding out the singular vector in all cases.

Figure 11:
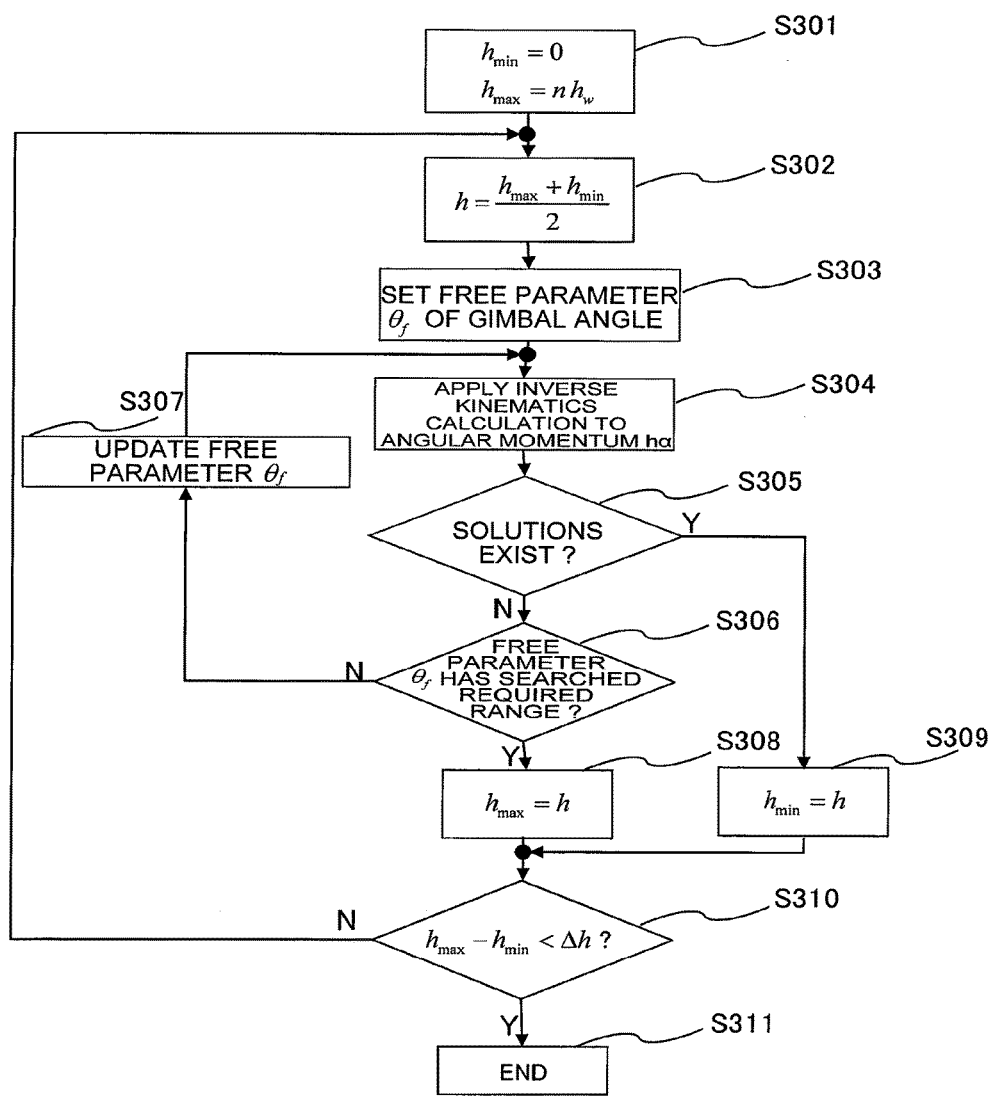
FIG. 11 is a flowchart for illustrating a sequence to be carried out when the attitude control device for a spacecraft according to the second embodiment of the present invention calculates a value of an angular momentum envelope exhibited when a direction of an angular momentum is defined.

Referring to FIG. 11, a description is now given of the calculation of the maximum angular momentum using the inverse kinematics calculation carried out by the inverse kinematics calculation unit 19. FIG. 11 is a flowchart for illustrating a sequence to be carried out when the attitude control device 10 for a spacecraft according to the second embodiment of the present invention calculates the value on the angular momentum envelope exhibited when a direction of an angular momentum is defined. In the processing illustrated in the flowchart of FIG. 11, bisection method is used in accordance with absence/presence of the gimbal solutions by the inverse kinematics calculation to calculate the value on the angular momentum envelope.

In Step S301, the motion planning unit 11 defines initial values of a minimum value $h_{min}$ and a maximum value $h_{max}$ of the magnitude of the angular momentum.

In this example, the magnitude of the angular momentum of the one CMG 1 is represented by $h_w$, and the maximum value $h_{max}$ and the minimum value $h_{min}$ of the magnitude of the angular momentum of the n CMGs are set to $nh_w$ and 0, respectively. The value $h_{max}$ corresponds to the minimum value of the magnitude of the angular momentum that cannot be generated by all the CMGs 1, and the value $h_{min}$ corresponds to the maximum value of the magnitude of the angular momentum that can be generated by all the CMGs 1. Moreover, the bisection method is carried out until $h_{max}-h_{min}$ infinitely approaches a set precision $\Delta h$.

In Step S302, the motion planning unit 11 sets $(h_{max}+h_{min})/2$ as an intermediate value, and sets the intermediate value as the magnitude h of the angular momentum. Moreover, the motion planning unit 11 calculates an angular momentum ha from the set intermediate value h and the unit vector α, and outputs the angular momentum ha to the inverse kinematics calculation unit 19. This angular momentum ha corresponds to a candidate value of the maximum angular momentum that can be generated by all the CMGs 1.

In Step S303, the inverse kinematics calculation unit 19 sets the value of the free parameter $\theta_f$.

In Step S304, the inverse kinematics calculation unit 19 uses the free parameter $\theta_f$ set in Step S303 to apply the inverse kinematics calculation to the angular momentum ha input from the motion planning unit 11. In other words, the inverse kinematics calculation unit 19 obtains solutions of the gimbal angles of the respective CMGs 1 for achieving the angular momentum ha. Moreover, the inverse kinematics calculation unit 19 outputs a calculation result to the motion planning unit 11.

In Step S305, the motion planning unit 11 examines the absence/presence of solutions of the gimbal angles for achieving the angular momentum ha from the calculation result input from the inverse kinematics calculation unit 19. When the motion planning unit 11 determines that solutions of the gimbal angles for achieving the angular momentum ha do not exist, processing of Step S306 is carried out. When the motion planning unit 11 determines that solutions of the gimbal angles for achieving the angular momentum ha exist, processing of Step S309 is carried out.

In Step S306, the inverse kinematics calculation unit 19 searches for whether or not the free parameter $\theta_f$ has moved across the entire area of the set range. When the inverse kinematics calculation unit 19 determines in Step S306 that the free parameter $\theta_f$ has not moved across the entire area of the set range, a range across which the free parameter $\theta_f$ can move is left, and hence processing of Step S307 is carried out.

In Step S307, the inverse kinematics calculation unit 19 updates the value of the free parameter $\theta_f$, and the processing returns to Step S304. Then, the inverse kinematics calculation unit 19 uses the updated free parameter $\theta_f$ to carry out again the processing of Step S304 and the subsequent steps.

On the other hand, when the inverse kinematics calculation unit 19 determines in Step S306 that the free parameter $\theta_f$ has moved across the entire area of the set range, it is considered that the solutions of the gimbal angles for the angular momentum ha of all the CMGs 1 do not exist even when the free parameter $\theta_f$ is changed within the set range, and hence processing of Step S308 is carried out.

In Step S308, the motion planning unit 11 determines that solutions of the gimbal angles for achieving the angular momentum ha do not exist, and thus sets h to $h_{max}$.

In Step S309, the motion planning unit 11 determines that solutions of the gimbal angles for achieving the angular momentum ha exist and the angular momentum of all the CMGs 1 can take the value of ha, and sets h to $h_{min}$.

In Step S310, the motion planning unit 11 calculates the value of $h_{max}-h_{min}$, and, when the value is less than the set precision $\Delta h$, sets the value of h at this time point as the value of the magnitude of the maximum angular momentum in the direction of α. Then, in Step S311, the series of processing steps is finished.

On the other hand, in Step S310, the motion planning unit 11 calculates the value of $h_{max}-h_{min}$, and, when the value is equal to or more than the set precision $\Delta h$, the processing returns to Step S302. Then, the motion planning unit 11 carries out again the processing of Step S302 and the subsequent steps.

In this way, the angular momentum ha corresponding to the candidate value of the maximum angular momentum that can be generated by all the CMGs 1 is successively updated in accordance with the absence/presence of the solutions of the gimbal angles of the respective CMGs for achieving the angular momentum ha, and the angular momentum ha updated last is set as the maximum angular momentum. Thus, the solutions can positively be obtained regardless of the direction of the angular momentum.

Specifically, the magnitude of the maximum angular momentum obtained when the direction of the angular momentum of all the CMGs 1 is defined is calculated through the bisection method in accordance with the absence/presence of the solutions by the inverse kinematics calculation, and hence the solutions can positively be obtained regardless of the direction of the angular momentum.

The case in which the bisection method is used as a specific method of identifying the maximum angular momentum by successively updating the candidate value of the maximum angular momentum is exemplified. However, another method other than the bisection method may be used as long as the method involves obtaining the solutions of the gimbal angles of the respective CMGs for achieving the candidate value of the maximum angular momentum, and successively update the candidate value in accordance with the absence/presence of the solutions of the gimbal angles of the respective CMGs, to thereby calculate the maximum angular momentum.

The calculation of from Step S1 to Step S5 illustrated in FIG. 9 and from Step S301 to Step S311 illustrated in FIG. 11 may be implemented by the processing circuit 101, the processor 102, or an independent processing circuit. The motion planning unit 11 stores in the memory the value of the maximum angular momentum and the approximate minimum drive period, which are obtained by carrying out the above-mentioned steps.

As described above, according to the second embodiment, the solutions of the gimbal angles of the respective CMGs for achieving the candidate value of the maximum angular momentum that can be generated by all the CMGs, which is the given angular momentum of all the CMGs, are obtained, and the maximum angular momentum is calculated by successively updating the candidate value of the maximum angular momentum in accordance with the absence/presence of the solutions of the gimbal angles of the respective CMGs.

As a result, when the artificial satellite carries out the attitude change, the value of the maximum angular momentum that can be generated by all the CMGs in the direction of the attitude change axis can positively be calculated. Moreover, through use of the maximum angular momentum that can be generated by all the CMGs, which is calculated in this way, the minimum drive period required for the attitude change can efficiently be calculated, which consequently leads to an increase in reliability of the motion planning of the CMGs when the artificial satellite carries out the attitude change.

Third Embodiment

In a third embodiment of the present invention, a description is given of a case in which the motion planning unit 11 calculates motion trajectories of gimbal angles via intermediate gimbal angles through use of the inverse kinematics calculation carried out by the inverse kinematics calculation unit 19. In the third embodiment, a description is omitted for the same points as those of the first and second embodiments, and a description is mainly given of differences from the first and second embodiments.

Figure 12:
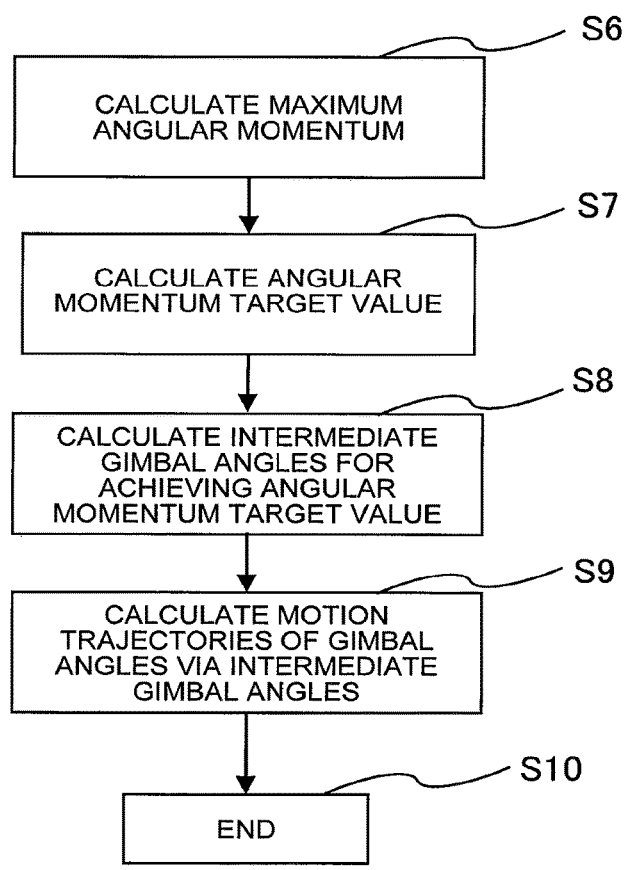
FIG. 12 is a flowchart for illustrating a sequence to be carried out when an attitude control device for a spacecraft according to a third embodiment of the present invention calculates motion trajectories of gimbal angles of the CMGs via intermediate gimbal angles.

FIG. 12 is a flowchart for illustrating a sequence to be carried out when the attitude control device 10 for a spacecraft according to the third embodiment of the present invention calculates motion trajectories of gimbal angles of the CMGs 1 via intermediate gimbal angles.

As illustrated in FIG. 12, the motion planning unit 11 calculates the Euler angle α for the attitude change from the attitude change target value of the artificial satellite, and then sets the angular momentum of all the CMGs 1 to the direction of a and calculates the maximum angular momentum that can be generated by all the CMGs 1 in this direction, as in the second embodiment (Step S6).

On this occasion, when the maximum angular momentum calculated in Step S6 is achieved by the CMGs 1, the artificial satellite can carry out the attitude change in an approximately minimum period. However, when all the CMGs 1 reach the maximum angular momentum, an angular momentum larger than the maximum angular momentum cannot be achieved. Thus, even when such a result of further adding an angular momentum is obtained in the attitude feedback control of the artificial satellite, control based on the result cannot be carried out.

Therefore, the calculation of the motion trajectories of the gimbal angles in the motion planning unit 11 is carried out as follows. Specifically, an angular momentum that has the same direction as that of the maximum angular momentum and is less than the maximum angular momentum by approximately, for example, 20%, is achieved by the respective CMGs 1, and the value of that angular momentum is held for a certain period, which results in calculation of motion trajectories that substantially achieve a desired attitude change. A value of a gimbal angle held for the certain period by each of the CMGs 1 is referred to as "intermediate gimbal angle".

The motion planning unit 11 calculates the angular momentum obtained by decreasing the maximum angular momentum in this way as an angular momentum target value (Step S7). Moreover, the motion planning unit 11 outputs the calculated angular momentum target value to the inverse kinematics calculation unit 19.

The inverse kinematics calculation unit 19 calculates the intermediate gimbal angles for achieving the angular momentum target value input from the motion planning unit 11 (Step S8). The processing of Step S8 is described later.

On this occasion, when the value of the angular momentum of all the CMGs 1 is the maximum angular momentum, the values of the gimbal angles for achieving the angular momentum are uniquely determined even when the number of the CMGs 1 is equal to or more than 4. However, when the value of the angular momentum of all the CMGs 1 is less than the maximum angular momentum, an infinite number of solutions of the gimbal angles for achieving the angular momentum exist in general.

Thus, in Step S8, the inverse kinematics calculation unit 19 selects solutions that minimize a certain evaluation function out of the solutions of the gimbal angles for achieving the angular momentum target value as optimal solutions, to thereby optimize the solutions. Moreover, the inverse kinematics calculation unit 19 sets the selected optimal solutions as the intermediate gimbal angles, and outputs the intermediate gimbal angles to the motion planning unit 11.

The motion planning unit 11 calculates the motion trajectories of the gimbal angles for achieving the attitude change target value of the artificial satellite based on the intermediate gimbal angles input from the inverse kinematics calculation unit 19 (Step S9), and finishes the series of processing steps (Step S10).

In this way, the motion planning unit 11 calculates the motion trajectories of the gimbal angles of the CMGs 1 via the intermediate gimbal angles in accordance with the sequence illustrated in FIG. 12.

On this occasion, the attitude control device 10 according to the third embodiment has a technical feature in that the attitude control device 10 is configured to use the inverse kinematics calculation carried out by the inverse kinematics calculation unit 19 to calculate the intermediate gimbal angles in Step S8 of FIG. 12.

Figure 13:
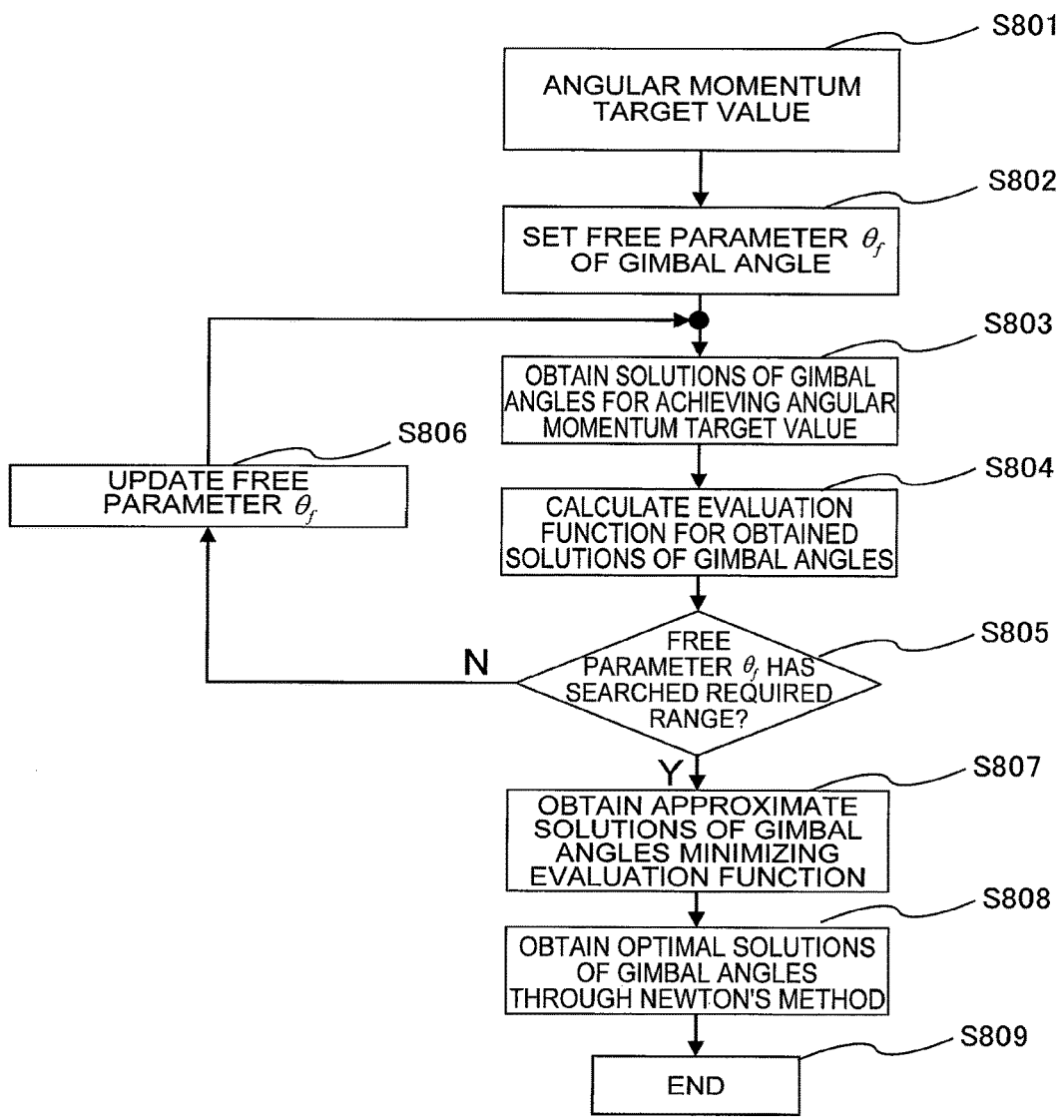
FIG. 13 is a flowchart for illustrating a sequence to be carried out when the attitude control device for a spacecraft according to the third embodiment of the present invention calculates the intermediate gimbal angles.

Referring to FIG. 13, a description is now given of the calculation of the intermediate gimbal angles through the inverse kinematics calculation carried out by the inverse kinematics calculation unit 19. FIG. 13 is a flowchart for illustrating a sequence to be carried out when the attitude control device 10 for a spacecraft according to the third embodiment of the present invention calculates the intermediate gimbal angles.

In Step S801, the motion planning unit 11 outputs the angular momentum target value calculated in Step S7 to the inverse kinematics calculation unit 19. Then, in Step S802, the inverse kinematics calculation unit 19 sets the values of the free parameters $\theta_f$ of the (n−3) gimbal angles.

In Step S803, the inverse kinematics calculation unit 19 uses the free parameters $\theta_f$ set in Step S802 to calculate the solutions of the gimbal angles for achieving the angular momentum target value input from the motion planning unit 11.

In Step S804, the inverse kinematics calculation unit 19 calculates values of the evaluation function for the solutions of the gimbal angles obtained in Step S803. The evaluation function is an index for evaluating the most appropriate solutions out of an infinite number of the solutions. For example, an index representing the magnitudes of the gimbal angles or an index representing a separation of a state of the solutions of the gimbal angles from a singular state is used as the evaluation function. It should be understood that other indices may be used.

A description is now given of an example of the evaluation function used in Step S804. As the evaluation function as the index representing the magnitudes of the gimbal angles, an evaluation function $J_\theta$ expressed by the following expression (10) may be used. An evaluation function for a case in which the number of the CMGs 1 is four is exemplified in the expression (10).

$$J_\theta = \theta_1^2 + \theta_2^2 + \theta_3^2 + \theta_4^2 \tag{10}$$

Moreover, in general, a relational expression expressed as the following expression (11) holds true between the gimbal angular velocities of the CMGs 1 and the attitude control torque acting on the artificial satellite in which the CMGs 1 are installed.

$$A\frac{d\theta}{dt} = \tau \tag{11}$$

In the expression (11), θ is a vector constructed by the gimbal angles, and τ is the attitude control torque acting on the artificial satellite. Moreover, a matrix A is a Jacobian matrix, and can be calculated as a function of the gimbal angles of the respective CMGs 1.

When the rank of the Jacobian matrix is 3, an appropriate torque can be achieved by rotating the gimbals of the CMGs 1, but the rank may be 2 for a combination of specific gimbal angles, and a case in which an appropriate torque cannot by achieved even by rotating the gimbal angles exists. This state is generally referred to as "singular state".

Moreover, as the evaluation function representing the separation from this singular state, the condition number of the Jacobian matrix may be used. Specifically, as the evaluation function that is the index representing the separation of the state of the solutions of the gimbal angles from the singular state, for example, an evaluation function $J_s$ expressed by the following expression (12) may be used.

$$J_s = \frac{\sigma_{max}(A)}{\sigma_{min}(A)} \tag{12}$$

In the expression (12), $\sigma_{max}(A)$ and $\sigma_{min}(A)$ are the maximum eigenvalue and the minimum eigenvalue of a Jacobian matrix A, respectively.

Returning to the description of FIG. 13, in Step S805, the inverse kinematics calculation unit 19 searches for whether or not the free parameter $\theta_f$ has moved across the entire area of the set range. When the inverse kinematics calculation unit 19 determines in Step S805 that the free parameter $\theta_f$ has not moved across the entire area of the set range, processing of Step S806 is carried out.

In Step S806, the inverse kinematics calculation unit 19 updates the value of the free parameter $\theta_f$, and the processing returns to Step S803. Then, the inverse kinematics calculation unit 19 uses the updated free parameter $\theta_f$ to carry out again the processing of Step S803 and the subsequent steps.

On the other hand, when the inverse kinematics calculation unit 19 determines in Step S805 that the free parameter $\theta_f$ has moved across the entire area of the set range, in Step S807, the inverse kinematics calculation unit 19 sets the solutions that minimize the evaluation function out of the solutions of the gimbal angles obtained at the current time point as approximate solutions approximate to the optimal solutions. The value of the free parameter $\theta_f$ is set to be discrete, and hence the approximate solutions obtained in Step S807 in this way are not considered as optimal solutions obtained when the value of the free parameter $\theta_f$ is continuously changed.

Thus, a possibility that those approximate solutions are not sufficient as the optimal solutions is considered, and Step S808 is accordingly provided. In Step S808, the inverse kinematics calculation unit 19 uses the Newton's method to correct the approximate solutions obtained in Step S807, and sets the corrected approximate solutions as the optimal solutions. In this case, solutions that strictly satisfy the angular momentum target value are obtained as the approximate solutions, and hence the convergence of the Newton's method is to be guaranteed.

Moreover, the inverse kinematics calculation unit 19 sets the optimal solutions obtained by correcting the approximate solutions as the intermediate gimbal angles. Then, in Step S809, the series of processing steps is finished.

In Step S807, the inverse kinematics calculation unit 19 may set solutions that minimize the evaluation function out of the solutions of the gimbal angles obtained at the current time point as the optimal solutions, and may set the optimal solutions as the intermediate gimbal angles. In this case, Step S808 does not need to be provided.

In this way, the solutions of the gimbal angles for achieving the angular momentum target value less than the maximum angular momentum are obtained through the inverse kinematics calculation, and the evaluation function is used for the obtained solutions of the gimbal angles to identify the optimal solutions, and the optimal solutions are set as the intermediate gimbal angles.

The calculation of from Step S6 to Step S10 illustrated in FIG. 12 and from Step S801 to Step S809 illustrated in FIG. 13 may be implemented by the processing circuit 101, the processor 102, or an independent processing circuit. The motion planning unit 11 stores in the memory the solutions of the optimal intermediate gimbal angles obtained by the calculation of the above-mentioned steps and the motion trajectories of the gimbal angles.

As described above, according to the third embodiment, the solutions of the gimbal angles of the respective CMGs for achieving a first angular momentum target value less than the maximum angular momentum that can be generated by all the CMGs, which is the given angular momentum of all the CMGs, are obtained, the solutions that minimize a first evaluation function are selected as first optimal solutions out of the calculated solutions of the gimbal angles of the respective CMGs for achieving the first angular momentum target value, and the selected first optimal solutions are set as the intermediate gimbal angles of the respective CMGs.

As a result, all the solutions of the gimbal angles of the respective CMGs satisfying the angular momentum target value of all the CMGs can be obtained from the angular momentum target value. Moreover, the appropriate intermediate gimbal angles can be obtained by using the evaluation function to obtain the optimal solutions out of the solutions of the gimbal angles, which leads to a decrease in the attitude change period and the avoidance of the singular points of the CMGs.

Fourth Embodiment

In a fourth embodiment of the present invention, a description is given of a case in which the steering control unit 15 calculates gimbal angular velocity correction values of the respective CMGs 1 from the attitude control torque through use of the inverse kinematics calculation carried out by the inverse kinematics calculation unit 19. In the fourth embodiment, a description is omitted for the same points as those of the first to third embodiments, and a description is mainly given of differences from the first to third embodiments.

Figure 14:
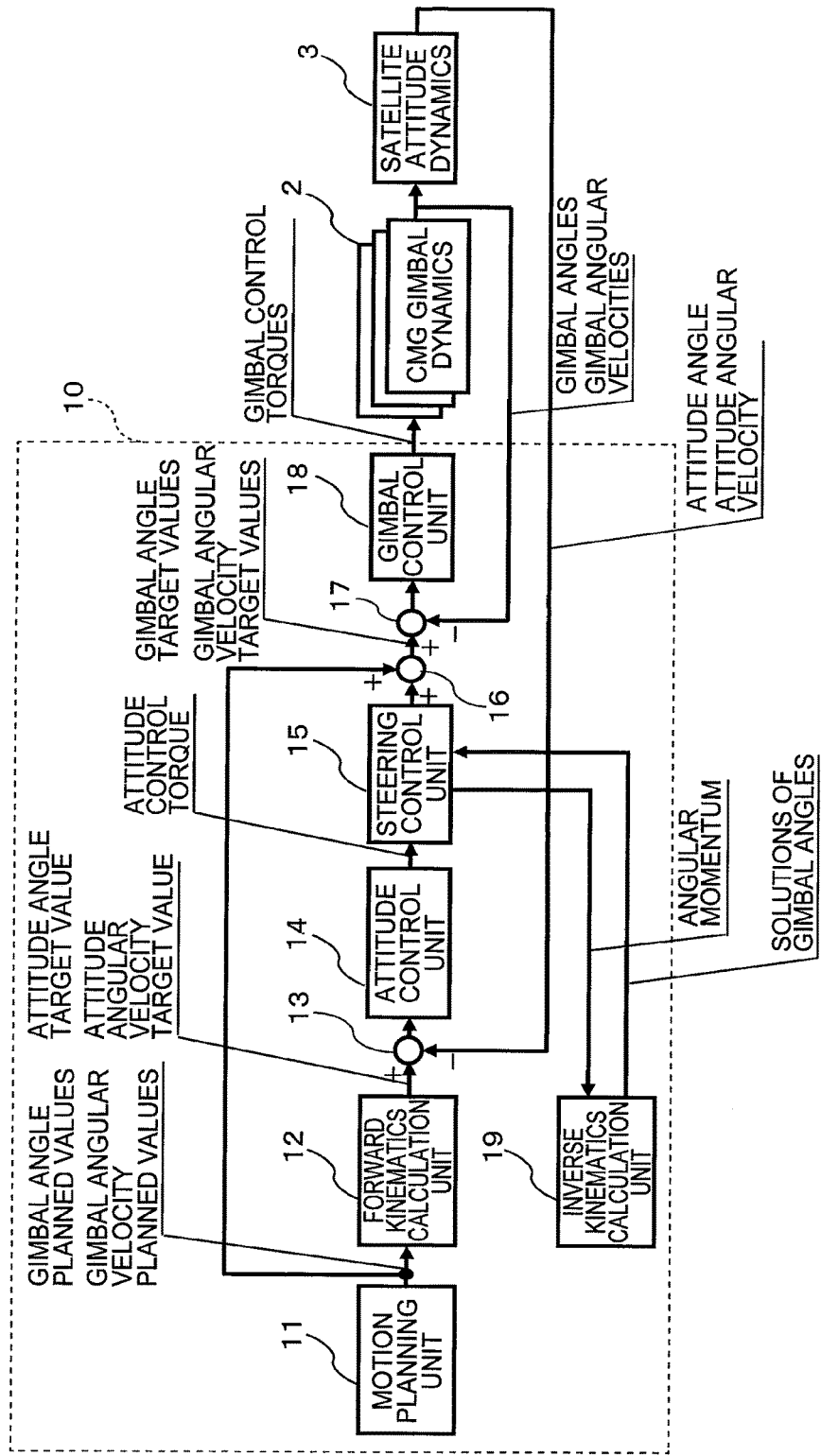
FIG. 14 is a block diagram for illustrating a configuration of an attitude control device for a spacecraft according to a fourth embodiment of the present invention.
Figure 15:
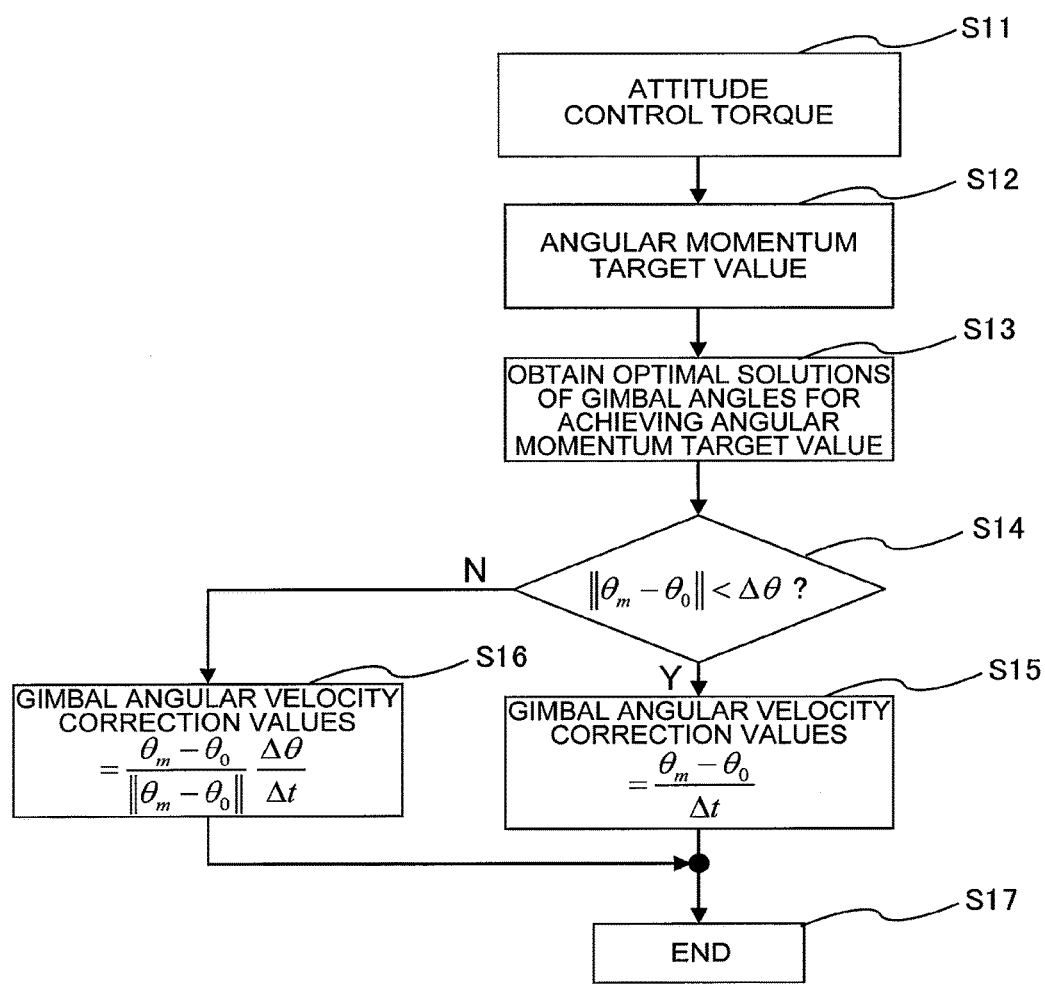
FIG. 15 is a flowchart for illustrating a sequence to be carried out when the attitude control device for a spacecraft according to the fourth embodiment of the present invention calculates gimbal angular velocity correction values of the respective CMGs.

FIG. 14 is a block diagram for illustrating a configuration of the attitude control device 10 for a spacecraft according to the fourth embodiment of the present invention. FIG. 15 is a flowchart for illustrating a sequence to be carried out when the attitude control device 10 for a spacecraft according to the fourth embodiment of the present invention calculates gimbal angular velocity correction values of the respective CMGs 1.

As illustrated in FIG. 15, the attitude control torque is given from the attitude control unit 14 to the steering control unit 15 (Step S11). When the attitude control torque is represented by $\tau$, an angular momentum change $\delta h$ of all the CMGs 1 is given by the following expression (13).

$$\delta h = -\tau \Delta t \qquad (13)$$

In the expression (13), $\Delta t$ is a sampling period, and a minus sign represents a state in which the reaction torque of the torque acting on the CMG 1 acts on the artificial satellite. Moreover, when a current value of the angular momentum of all the CMGs 1 is represented by $h_0$, the angular momentum target value after $\Delta t$ is given by $h_0 + \delta h$.

The steering control unit 15 calculates the angular momentum change $\delta h$ of all the CMGs 1 in accordance with the expression (13), and adds the current value $h_0$ of the angular momentum of all the CMGs 1 to the calculated angular momentum change $\delta h$, to thereby calculate the angular momentum target value (Step S12). In this way, the steering control unit 15 calculates the minute change amount of the angular momentum of all the CMGs 1 from the attitude control torque input from the attitude control unit 14, and adds the minute change amount to the current value of the angular momentum of all the CMGs 1, to thereby calculate the angular momentum target value. Moreover, the steering control unit 15 outputs the angular momentum target value calculated in Step S12 to the inverse kinematics calculation unit 19.

The inverse kinematics calculation unit 19 calculates the optimal solutions of the gimbal angles of the respective CMGs 1 for achieving the angular momentum target value input from the steering control unit 15 (Step S13). On this occasion, the inverse kinematics calculation unit 19 uses an evaluation function to carry out the same processing as that of the flowchart of FIG. 13, to thereby obtain the optimal solutions of the gimbal angles of the respective CMGs 1. In other words, the inverse kinematics calculation unit 19 sets solutions that minimize a certain evaluation function as the optimal solutions out of the solutions of the gimbal angles for achieving the angular momentum target value.

Moreover, the inverse kinematics calculation unit 19 outputs the optimal solutions of the gimbal angles of the respective CMGs 1 to the steering control unit 15.

Then, the steering angle control unit 15 obtains $\theta_m - \theta_o$, which is a difference between the optimal solutions (optimal solutions are hereinafter also referred to as "$\theta_m$") input from the inverse kinematics calculation unit 19 and the values $\theta_o$ of the current gimbal angles, and compares the norm $\|\theta_m - \theta_o\|$ of the difference and the set value $\Delta\theta$ with each other (Step S14). The set value $\Delta\theta$ is an amount for defining the maximum value of the magnitude of the gimbal angular velocity correction values.

When the norm $\|\theta_m - \theta_o\|$ is less than the set value $\Delta\theta$, the steering control unit 15 sets the gimbal angular velocity correction values of the respective CMGs 1 as follows (Step S15):

$$\frac{\theta_m - \theta_0}{\Delta t}$$

and finishes the series of processing steps (Step S17).

Meanwhile, when the norm $\|\theta_m - \theta_o\|$ is equal to or more than the set value $\Delta\theta$, the steering control unit 15 sets the gimbal angular velocity correction values of the respective CMGs 1 as follows (Step S16):

$$\frac{\theta_m - \theta_0}{\|\theta_m - \theta_0\|} \cdot \frac{\Delta\theta}{\Delta t}$$

and finishes the series of processing steps (Step S17).

On this occasion, the norm $\|\theta_m - \theta_o\|$ can be used as an example of the evaluation function used in Step S13. In this case, it is only necessary to select solutions of the gimbal angles that minimize the difference from the current gimbal angles $\theta_0$ in the norm $\|_m - \theta_o\|$ as the optimal solutions.

In this way, the solutions of the gimbal angles for achieving the angular momentum target value of all the CMGs 1 are obtained through the inverse kinematics calculation, and the evaluation function is used for the obtained solutions of the gimbal angles to identify the optimal solutions, and the optimal solutions are used to calculate the gimbal angular velocity correction values. The appropriate gimbal angular velocity correction values can thus always be calculated even under a singular state in which an inverse matrix of the Jacobian matrix cannot be obtained when the gimbal angular velocity correction values are calculated from the attitude control torque, and as a result, the singular state can naturally be passed over. The gimbal angle correction value can be obtained by integrating the obtained gimbal angular velocity correction value in terms of time.

The calculation of from Step S11 to Step S17 illustrated in FIG. 15 may be implemented by the processing circuit 101, the processor 102, or an independent processing circuit. The steering control unit 15 stores in the memory the gimbal angle correction values and the gimbal angular velocity correction values obtained by the calculation of the above-mentioned steps.

As described above, according to the fourth embodiment, the solutions that minimizes a second evaluation function are selected as second optimal solutions out of the solutions of the gimbal angles of the respective CMGs for achieving a second angular momentum target value, which is the sum of the minute change amount of the angular momentum of all the CMGs calculated from the attitude control torque, which is the given angular momentum of all the CMGs, and the current value of the angular momentum of all the CMGs, and the gimbal angular velocity correction values of the respective CMGs are calculated in accordance with the selected second optimal solutions.

As a result, all the solutions of the gimbal angles of the respective CMGs satisfying the angular momentum target value of all the CMGs can be obtained from the angular momentum target value. Moreover, the gimbal angular velocity correction values of the respective CMGs can be obtained in accordance with the solutions selected through the evaluation function out of the solutions of the gimbal angles. Moreover, even when the CMG enters a singular state, such a gimbal angular velocity correction value that the singular state is naturally passed over can be obtained, resulting in an increase in reliability of the attitude control system.

The first to fourth embodiments of the present invention have been individually described above, but the configurations of the above-mentioned first to fourth embodiments can be freely combined with each other. It should be understood that, in this case, the effects of the respective embodiments can be redundantly obtained.

The invention claimed is:

1. An attitude control device for a spacecraft, which is configured to control an attitude of a spacecraft through use of a plurality of CMGs, the plurality of CMGs being installed in the spacecraft and each comprising a wheel configured to rotate about a spin axis, and a gimbal configured to support the wheel and to rotate about a gimbal axis orthogonal to the spin axis, the attitude control device comprising a processor, wherein the processor:

obtains solutions of gimbal angles of the plurality of CMGs required for achieving a given angular momentum of all the plurality of CMGs;

feeds back observed values of an attitude angle and an attitude angular velocity of the spacecraft, and observed values of the gimbal angles and gimbal angular velocities of the respective plurality of CMGs, to thereby calculate gimbal control torques of the respective plurality of CMGs required for achieving a desired attitude change in the spacecraft; and calculates the gimbal control torques of the plurality of CMGs through use of the solutions of the gimbal angles of the plurality of CMGs obtained from the angular momentum of all the plurality of CMGs; and when a number of the plurality of CMGs is represented by n, wherein n is an integer of 4 or more, sets (n−3) gimbal angles out of n gimbal angles corresponding to the n CMGs as free parameters, and uses an algebraic equation representing a relationship among three gimbal angles out of the n gimbal angles, the free parameters, and the angular momentum of all the plurality of CMGs to solve the algebraic equation while changing values of the free parameters within set ranges, to thereby obtain the solutions of the gimbal angles of the plurality of CMGs for achieving the given angular momentum of all the plurality of CMGs.

2. The attitude control device for a spacecraft according to claim 1, wherein the processor further:

calculates gimbal angle planned values and gimbal angular velocity planned values of the respective plurality of CMGs;

calculates an attitude angle target value and an attitude angular velocity target value of the spacecraft from the gimbal angle planned values and the gimbal angular velocity planned values of the respective plurality of CMGs;

calculates an attitude control torque for controlling the attitude of the spacecraft from the attitude angle target value and the attitude angular velocity target value of the spacecraft and the observed values of the attitude angle and the attitude angular velocity of the spacecraft;

calculates gimbal angle correction values and gimbal angular velocity correction values of the respective plurality of CMGs from the attitude control torque;

adds the gimbal angle planned values and the gimbal angular velocity planned values of the respective plurality of CMGs and the gimbal angle correction values and the gimbal angular velocity correction values of the respective plurality of CMGs to one another, respectively, to thereby calculate gimbal angle target values and gimbal angular velocity target values of the respective plurality of CMGs; and calculates the gimbal control torques of the respective plurality of CMGs from the gimbal angle target values and the gimbal angular velocity target values of the respective plurality of CMGs and the observed values of the gimbal angles and the gimbal angular velocities of the respective plurality of CMGs.

3. The attitude control device for a spacecraft according to claim 2, wherein the processor further:

sets a candidate value of a maximum angular momentum that all the plurality of CMGs are able to generate, as the given angular momentum of all the plurality of CMGs;

obtains solutions of the gimbal angles of the respective plurality of CMGs for achieving the candidate value; and successively updates the candidate value in accordance with absence or presence of the solutions of the gimbal angles of the respective plurality of CMGs for achieving the candidate value, to thereby calculate the maximum angular momentum.

4. The attitude control device for a spacecraft according to claim 3, wherein the processor further:
calculates a first angular momentum target value less than the maximum angular momentum that all the plurality of CMGs are able to generate, and sets the calculated first angular momentum target value as the given angular momentum of all the plurality of CMGs; and
obtains solutions of the gimbal angles of the respective plurality of CMGs for achieving the first angular momentum target value, selects solutions that minimize a first evaluation function as first optimal solutions out of the obtained solutions of the gimbal angles of the respective plurality of CMGs for achieving the first angular momentum target value, and sets the selected first optimal solutions as intermediate gimbal angles of the respective plurality of CMGs.

5. The attitude control device for a spacecraft according to claim 4, wherein the processor further:
calculates a minute change amount of the angular momentum of all the plurality of CMGs from the attitude control torque, adds the minute change amount to a current value of the angular momentum of all the plurality of CMGs to calculate a second angular momentum target value, and sets the calculated second angular momentum target value as the given angular momentum of all the plurality of CMGs;
obtains solutions of the gimbal angles of the respective plurality of CMGs for achieving the second angular momentum target value, selects solutions that minimize a second evaluation function as second optimal solutions out of the obtained solutions of the gimbal angles of the respective plurality of CMGs for achieving the second angular momentum target value; and
calculates the gimbal angular velocity correction values of the respective plurality of CMGs in accordance with the second optimal solutions.

6. The attitude control device for a spacecraft according to claim 3, wherein the processor further:
calculates a minute change amount of the angular momentum of all the plurality of CMGs from the attitude control torque, adds the minute change amount to a current value of the angular momentum of all the plurality of CMGs to calculate a second angular momentum target value, and sets the calculated second angular momentum target value as the given angular momentum of all the plurality of CMGs;
obtains solutions of the gimbal angles of the respective plurality of CMGs for achieving the second angular momentum target value, selects solutions that minimize a second evaluation function as second optimal solutions out of the obtained solutions of the gimbal angles of the respective plurality of CMGs for achieving the second angular momentum target value; and
calculates the gimbal angular velocity correction values of the respective plurality of CMGs in accordance with the second optimal solutions.

7. The attitude control device for a spacecraft according to claim 2, wherein the processor further:
calculates a first angular momentum target value less than the maximum angular momentum that all the plurality of CMGs are able to generate, and sets the calculated first angular momentum target value as the given angular momentum of all the plurality of CMGs; and
obtains solutions of the gimbal angles of the respective plurality of CMGs for achieving the first angular momentum target value, selects solutions that minimize a first evaluation function as first optimal solutions out of the obtained solutions of the gimbal angles of the respective plurality of CMGs for achieving the first angular momentum target value, and sets the selected first optimal solutions as intermediate gimbal angles of the respective plurality of CMGs.

8. The attitude control device for a spacecraft according to claim 7, wherein the processor further:
calculates a minute change amount of the angular momentum of all the plurality of CMGs from the attitude control torque, adds the minute change amount to a current value of the angular momentum of all the plurality of CMGs to calculate a second angular momentum target value, and sets the calculated second angular momentum target value as the given angular momentum of all the plurality of CMGs;
obtains solutions of the gimbal angles of the respective plurality of CMGs for achieving the second angular momentum target value, selects solutions that minimize a second evaluation function as second optimal solutions out of the obtained solutions of the gimbal angles of the respective plurality of CMGs for achieving the second angular momentum target value; and
calculates the gimbal angular velocity correction values of the respective plurality of CMGs in accordance with the second optimal solutions.

9. The attitude control device for a spacecraft according to claim 2, wherein the processor further:
calculates a minute change amount of the angular momentum of all the plurality of CMGs from the attitude control torque, adds the minute change amount to a current value of the angular momentum of all the plurality of CMGs to calculate a second angular momentum target value, and sets the calculated second angular momentum target value as the given angular momentum of all the plurality of CMGs;
obtains solutions of the gimbal angles of the respective plurality of CMGs for achieving the second angular momentum target value, selects solutions that minimize a second evaluation function as second optimal solutions out of the obtained solutions of the gimbal angles of the respective plurality of CMGs for achieving the second angular momentum target value; and
calculates the gimbal angular velocity correction values of the respective plurality of CMGs in accordance with the second optimal solutions.

10. A method of controlling an attitude of a spacecraft, the method comprising:
setting, when a number of CMGs is represented by n, wherein n is an integer of 4 or more, (n−3) gimbal angles out of n gimbal angles corresponding to the n CMGs as free parameters; and
using an algebraic equation representing a relationship among three gimbal angles out of the n gimbal angles, the free parameters, and an angular momentum of all the CMGs to solve the algebraic equation while changing values of the free parameters within set ranges, to thereby obtain solutions of the gimbal angles of the respective CMGs for achieving a given angular momentum of all the CMGs; and
controlling the attitude of the spacecraft based on the solutions of the gimbal angles of the respective CMGs that achieve the given angular momentum of all the CMGs.

* * * * *